(12) United States Patent
Chiu et al.

(10) Patent No.: US 11,960,994 B2
(45) Date of Patent: Apr. 16, 2024

(54) ARTIFICIAL INTELLIGENCE-BASED HIERARCHICAL PLANNING FOR MANNED/UNMANNED PLATFORMS

(71) Applicant: SRI International, Menlo Park, CA (US)

(72) Inventors: Han-Pang Chiu, West Windsor, NJ (US); Jonathan D. Brookshire, Princeton, NJ (US); Zachary Seymour, Pennington, NJ (US); Niluthpol C. Mithun, Lawrenceville, NJ (US); Supun Samarasekera, Skillman, NJ (US); Rakesh Kumar, West Windsor, NJ (US); Qiao Wang, New York, NY (US)

(73) Assignee: SRI International, Menlo Park, CA (US)

( * ) Notice: Subject to any disclaimer, the term of this patent is extended or adjusted under 35 U.S.C. 154(b) by 726 days.

(21) Appl. No.: 17/151,506

(22) Filed: Jan. 18, 2021

(65) Prior Publication Data

US 2023/0394294 A1 Dec. 7, 2023

Related U.S. Application Data

(60) Provisional application No. 62/961,798, filed on Jan. 16, 2020.

(51) Int. Cl.
*G06N 3/08* (2023.01)
*G06N 3/084* (2023.01)
(Continued)

(52) U.S. Cl.
CPC .............. *G06N 3/08* (2013.01); *G06N 3/084* (2013.01); *G06N 3/096* (2023.01); *G06N 3/098* (2023.01); *G06N 20/00* (2019.01)

(58) Field of Classification Search
CPC .......... G06N 3/08; G06N 20/00; G06N 3/098; G06N 3/096; G06N 3/084
See application file for complete search history.

(56) References Cited

U.S. PATENT DOCUMENTS

2018/0232508 A1\* 8/2018 Kursun ................. G06N 3/045
2021/0192412 A1\* 6/2021 Krishnaswamy .. G06Q 30/0201

OTHER PUBLICATIONS

Vincent Francois-Lavet, Peter Henderson, Riashat Islam, Marc G. Bellemare, Joelle Pineau, "An Introduction to Deep Reinforcement Learning". Foundations and Trends in Machine Learning. 11 (3-4): 219-354, 2018.

(Continued)

*Primary Examiner* — Asghar H Bilgrami
(74) *Attorney, Agent, or Firm* — MOSER TABOADA

(57) ABSTRACT

A method, apparatus and system for artificial intelligence-based HDRL planning and control for coordinating a team of platforms includes implementing a global planning layer for determining a collective goal and determining, by applying at least one machine learning process, at least one respective platform goal to be achieved by at least one platform, implementing a platform planning layer for determining, by applying at least one machine learning process, at least one respective action to be performed by the at least one of the platforms to achieve the respective platform goal, and implementing a platform control layer for determining at least one respective function to be performed by the at least one of the platforms. In the method, apparatus and system despite the fact that information is shared between at least two of the layers, the global planning layer, the platform planning layer, and the platform control layer are trained separately.

24 Claims, 13 Drawing Sheets

(51) Int. Cl.
G06N 3/096 (2023.01)
G06N 3/098 (2023.01)
G06N 20/00 (2019.01)

(56) References Cited

OTHER PUBLICATIONS

Han-Pang Chiu et al., "Constrained Optimal Selection for Multi-Sensor Robot Navigation Using Plug-and-Play Factor Graphs", IEEE International Conference on Robotics and Automation (ICRA), 2014.
Han-Pang Chiu et al., "Augmented Reality Driving Using Semantic Geo-Registration", IEEE International Conference on Virtual Reality (VR), 2018.
Han-Pang Chiu et al., "Semantically-Aware Attentive Neural Embeddings for Image-Based Visual Localization", British Machine Vision Conference (BMVC), 2019.
P. Battaglia et al., "Relational inductive biases, deep learning, and graph networks", Arxiv: 1806.01261 v3. Oct. 2018.
M. Jaderberg, "Reinforcement Learning with Unsupervised Auxiliary Tasks", Arxiv: 1611.05397vl. Nov. 2016.
L. Pinto et al., "Robust Adversarial Reinforcement Learning", ICML, 2017.
A. Sanchez-Gonzalez et al., "Graph Networks as Learnable Physics Engines for Inference and Control". ICML, 2018.
K. Arulkumaran, M. P. Deisenroth, M. Brundage, A. A. Bharath, "Deep Reinforcement Learning: A Brief Survey". IEEE Signal Processing Magazine. 34 (6): 26-38.
A. Kumar, S. Gupta, and J. Malik, "Learning Navigation Subroutines by Watching Videos", Arxiv: 1905.12612v2, May 2019.
A. Kendall et al., "Learning to Drive in a Day", Arxiv: 1807.00412, 2018.
P. Mirowski et al., "Learning to Navigate in Cities Without a Map", Arxiv: 1804.00168, 2018.
D. Ha and J. Schmidhuber. "Recurrent world models facilitate policy evolution." NIPS, 2018.
K. Kurach et al., "Google Research Football: A Novel Reinforcement Learning Environment." Arxiv: 1907.11180. Jul. 2019.
F. Leno Da Silva et al., "Autonomously Reusing Knowledge in Multiagent Reinforcement Learning." IJCAI, 2018.
P. Gay et al., "Visual Graphs from Motion (VGfM): Scene understanding with object geometry reasoning." ACCV, 2018.
Y. Zhou et al., "SceneGraphNet: Neural Message Passing for 3D Indoor Scene Augmentation." Arxiv: 1907.11308. Jul. 2019.

* cited by examiner

ARTIFICIAL INTELLIGENCE-BASED HIERARCHICAL PLANNING FOR MANNED/UNMANNED PLATFORMS

CROSS-REFERENCE TO RELATED APPLICATIONS

This application claims benefit of and priority to U.S. provisional patent application Ser. No. 62/961,798, filed Jan. 16, 2020, which is herein incorporated by reference in its entirety.

FIELD

Embodiments of the present principles generally relate to the control and operation of multi-domain platforms, and more particularly, to the collaborative guidance and planning of manned and unmanned platforms using a hierarchical, artificial intelligence learning approach.

BACKGROUND

In recent years, artificial intelligence (AI) techniques, with deep reinforcement learning (DRL) leading the way, are being developed to address problems in the planning and tasking field. DRL-based methods learn how to achieve a goal through a mapping from situations to actions, by trial-and-error interactions with an environment. Although DRL-based methods require more training time and environment interactions compared to conventional geometry-based methods, DRL-based methods offer several significant benefits for this problem domain.

For example, DRL-based methods are able to learn team-level strategies; there is no need for explicit prior mapping in DRL-based methods; once trained, a DRL-based platform can immediately begin navigating in new environments without a prior map; DRL-based methods contain better generalization to new environments without the need for an underlying model of "known" place types/explicit domain models; and in DRL-based methods planning goals can be defined semantically (e.g., to find types of rooms or types of objects) rather than as points in the space.

Currently, however, DRL methods cannot handle the difficulties in accurate and rapid team planning for multi-domain manned/unmanned platforms across different complex, dynamic situations applied toward a common tactical goal.

SUMMARY

Embodiments of methods, apparatuses and systems for hierarchical, deep reinforcement learning (DRL) based planning and control for coordinating a team of multi-domain platforms/agents are disclosed herein.

In some embodiments in accordance with the present principles, an artificial intelligence-based method for coordinating a team of platforms includes implementing a global planning layer for determining a collective goal for the team of the platforms and determining, by applying at least one machine learning process, at least one respective platform goal to be achieved by at least one of the platforms to achieve the determined collective goal. The method further includes implementing a platform planning layer for determining, by applying at least one machine learning process, at least one respective action to be performed by the at least one of the platforms to achieve the respective platform goal and implementing a platform control layer for determining at least one respective function to be performed by the at least one of the platforms to perform the at least one respective action. In at least some embodiment, in the method, information is shared between at least two of the global planning layer, the platform planning layer, and the platform control layer to assist in determining at least one of the collective goal for the team of the platforms, the at least one respective platform goal, the at least one respective action, and the at least one respective function, and the global planning layer, the platform planning layer, and the platform control layer are trained separately.

In some embodiments, the at least one machine learning process applied by at least one of the global planning layer and the platform planning layer can include a policy planning process, which rewards a platform for performing an action which advances an achievement of at least one of the determined collective goal for the team of the platforms, the determined at least one respective platform goal, and the determined at least one respective action.

In some embodiments, the platform control layer can be implemented for controlling at least one platform to perform at least one determined function.

In some embodiments in accordance with the present principles, a system for coordinating a team of platforms includes a global planning module implementing a global planning layer for determining a collective goal for the team of the platforms and determining, by applying at least one machine learning process, at least one respective platform goal to be achieved by at least one of the platforms to achieve the determined collective goal, a platform planning module implementing a platform planning layer for determining, by applying at least one machine learning process, at least one respective action to be performed by the at least one of the platforms to achieve the respective platform goal, and a platform control module implementing a platform control layer for determining at least one respective function to be performed by the at least one of the platforms to perform the at least one respective action.

In some embodiments, in such systems, information is shared between at least two of the global planning layer, the platform planning layer, and the platform control layer to assist in determining at least one of the collective goal for the team of the platforms, the at least one respective platform goal, the at least one respective action, and the at least one respective function, and the global planning layer, the platform planning layer, and the platform control layer are trained separately.

In some embodiments, in systems of the present principles the platform control module further implements the platform control layer for controlling the at least one of the platforms to perform the at least one respective function.

In some embodiments of the present principles, a non-transitory computer readable medium includes stored thereon, software instructions that when executed by the at least one processor of a computing device, cause the computing device to perform an artificial intelligence-based method for coordinating a team of platforms includes. In some embodiments, the method includes implementing a global planning layer for determining a collective goal for the team of the platforms, and determining, by applying at least one machine learning process, at least one respective platform goal to be achieved by at least one of the platforms to achieve the determined collective goal. In some embodiments, the method can further include implementing a platform planning layer for determining, by applying at least one machine learning process, at least one respective action to be performed by the at least one of the platforms to achieve the respective platform goal, and implementing a platform control layer for determining at least one respective function to be performed by the at least one of the platforms to perform the at least one respective action. In some embodiments of the present principles, information is shared between at least two of the global planning layer, the platform planning layer, and the platform control layer to assist in determining at least one of the collective goal for the team of the platforms, the at least one respective platform goal, the at least one respective action, and the at least one respective function, and the global planning layer, the platform planning layer, and the platform control layer are trained separately.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
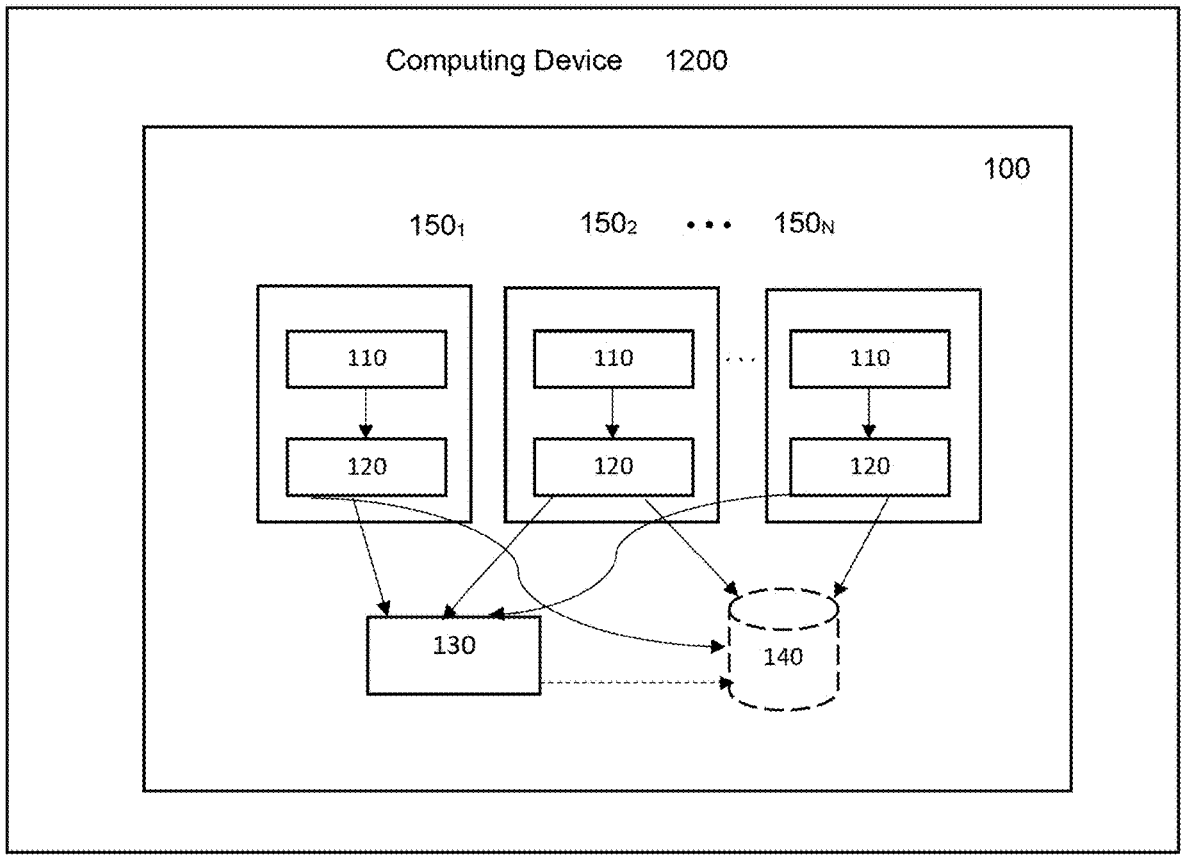
FIG. 1 depicts a high-level block diagram of a hierarchical deep reinforced learning (HDRL) system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for artificial intelligence-based hierarchical planning and control for coordinating a team of multi-domain platforms/agents. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific applications, such as a military application, such teachings should not be considered limiting. On the contrary, embodiments in accordance with the present principles can be applied for the planning and the control of substantially any coordinated agent platform such as autonomous car operation, mixed reality and gaming platforms, manned/unmanned platforms, and for the planning and control of swarms of robots, each operating in a decentralized but still coordinated manner. Alternatively or in addition, in some embodiments, the planning and control can be done in a centralized manner using a central computing device.

Embodiments of the present principles include an artificial intelligence (AI) enabled hierarchical planning strategy for coordinating a team of multi-domain, unmanned/manned platforms/agents.

As used herein, the terms platform and/or agent are used to describe substantially any device that can participate in performing an action that can contribute to a total system goal. For example, in some embodiments a platform/agent can include, but is not limited to, a robot, an automobile, an manned/unmanned aerial vehicle, a manned/unmanned ground vehicle, a manned/unmanned underwater vehicle, a drone, a computing device, a virtual device/character, and the like.

Some embodiments of the present principles implement deep reinforcement learning (DRL) and a hierarchical architecture to guide a team of heterogeneous platforms (that can have different size, mobility, power, and sensing capability) to exploit their complementary strengths for achieving challenging missions. In some embodiments, the platform/agents can navigate intelligently without requiring prior maps and in dynamic, cluttered environments are able to learn how to handle unexpected situations as independent autonomous agents in novel environments. In some embodiments, a system of the present principles can enable a single user to influence/control heterogeneous swarms of autonomous platforms and provide for simplified planning by isolating different hierarchical layers (e.g., deliberative, perceptive, reactive). In some embodiments, each layer focuses on different domains (such as long-term mission/short-term task, team-level/unit-level) and provides decentralized hierarchical Deep Reinforcement Learning (DRL) and each layer can be trained separately.

In some embodiments, a system of the present principles can learn robust team-level and platform-level task execution within the higher-level mission plan, can learn to handle communications limitations for decentralized task planning, and can learn to model new environments dynamically as scene graphs. Furthermore, in some embodiments, a system of the present principles can improve DRL efficiency by effectively abstracting semantic scene entities with relationships from the environment and can incorporate prior knowledge via graph networks. Embodiments of the present principles dramatically reduce time to plan in new domains using hierarchical DRL planning architecture, semantic reasoning, domain knowledge and learned with a dramatically lower requirement for training data. Embodiments of the present principles enable efficient curriculum learning for DRL in stages where low-level abstraction is trained with more data but can apply to broader domains, and where higher-level abstractions require much less data for training but are more specific to domains and each layer can be trained separately.

Embodiments of the present principles can have boundless applications including the control of an autonomous car operating in crowded cities like India, in which traffic rules are not being obeyed. Systems of the present principles can also provide autonomous control of agents for mixed reality and gaming and can coordinated operations of manned/unmanned platforms. Systems of the present principles can further include collaborative autonomy of swarms of robots, each operating in a decentralized, but still coordinated manner.

FIG. 1 depicts a high-level block diagram of a hierarchical, DRL (HDRL) system 100 for planning and control of multiple platforms, such as a team of multi-domain manned/unmanned platforms having a collective goal, in accordance with an embodiment of the present principles. The HDRL system 100 of FIG. 1 illustratively comprises a plurality of platform control modules $110_1$-$110_N$ (collectively platform control modules 110), in the embodiment of FIG. 1, at least one platform control module 110 for each platform 150 of the team of multi-domain manned/unmanned platforms $150_1$-$150_N$. The HDRL system 100 of FIG. 1 further illustratively comprises a plurality of, platform planning modules $120_1$-$120_N$ (collectively platform planning modules 120, also referred to herein as platform planning modules 120), in the embodiment of FIG. 1, at least one platform planning module 120 for each platform 150, and a global planning module 130. The HDRL system 100 of FIG. 1 can further include an optional storage device 140 for storing information including but not limited to, data/images collected by the platforms 150, data/information input by a human (described in greater detail below), models determined by the HDRL system 100, and the like. In embodiments of the present principles, data collected/determined by each of the platforms 150 and stored in the optional storage device 140 can be accessed by each of the platform control modules 110, the platform planning modules 120, and the global planning module 130 for performing aspects of the present principles, as will be described in greater detail below.

As depicted in FIG. 1, embodiments of an HDRL system of the present principles, such as the HDRL system 100 of FIG. 1, can be implemented in a computing device 1200 in accordance with the present principles (described in greater detail below with reference to FIG. 12). The embodiment of the HDRL system 100 of FIG. 1 illustratively depicts a centralized system for coordinating a team of platforms in which each platform of a team of platforms includes at least one platform control module 110 and at least one platform planning module 120 and the global planning module 130 resides in a centralized computing device.

Although in the embodiment of the HDRL system 100 of FIG. 1, each platform 150 is illustrated as comprising a platform control module 110 and a platform planning module 120, alternatively or in addition, in some embodiments of a HDRL system of the present principles, functionality of the platform control module 110 and the platform planning module 120 can be services/modules provided externally to each platform 150 to perform the functionalities of an HDRL system of the present principles and do not have to reside within each platform 150 as illustrated in FIG. 1. Furthermore, alternatively or in addition, in some embodiments of a HDRL system of the present principles, a platform 150 can include or be associated with a dedicated platform control module 110, platform planning module 120 and global planning module 130 for performing the functionality of the present principles. For example, in some embodiments, a global planning module, a platform planning module and a platform control module reside in each of the platforms of the team of platforms for creating a decentralized system for coordinating a team of platforms. In addition, although in the embodiment of FIG. 1, the HDRL system 100 is described as comprising at least one platform control module 110 and one platform planning module 120 for each platform, in alternate embodiments of the present principles, a platform control module 110 and a platform planning module 120 can be configured to apply to a group of one or more platforms. Further, it should be noted that in accordance with the present principles, the platforms 150 of the HDRL system of the present principles can comprise platforms/agents of different types and capabilities.

In accordance with embodiments of the present principles, a hierarchical processing architecture having multiple layers can be implemented for coordinating a team of platforms to accomplish a global mission/goal. For example and with reference to the HDRL system 100 of FIG. 1, in some embodiments the global planning module 130, the platform planning modules 120, and the platform control modules 110 can be used to develop a hierarchical processing architecture having at least global planning layer, a platform planning layer, and a platform control layer. In some embodiments, the global planning layer can be implemented for determining a collective goal for the team of the platforms and for determining at least one respective platform goal to be achieved by at least one platform to achieve the determined, collective goal.

The platform planning layer can be implemented for determining at least one respective action to be performed by the at least one of the platforms to achieve the respective platform goal. That is, the platform planning layer can determine actions to be taken by at least some of the platforms for achieving the respective platform goals determined for the platforms, which when performed, collectively achieve the collective goal for the team of platforms.

The platform control layer can be implemented for determining respective functions to be performed by at least some of the platforms to perform the at least one respective action that was determined for a respective platform. As recited above, in embodiments of the present principles, an HDRL system of the present principles can comprise platforms/vehicles of different types and capabilities and, as such, the platform control layer has to be capable of causing platforms of many different types and capabilities to perform functions to at least accomplish the respective actions determined for each platform. In such embodiments, platform control module 110 of the present principles must be capable of causing such functions to be accomplished by the respective platforms and in at least some embodiments, the platform control modules 110 can be configured to communicate with respective, different platforms to interact with at least some of, if not all of, the capabilities of the different platforms.

In accordance with the present principles, communication can exist between the different hierarchical layers (e.g., the platform control layer, the platform planning layer, and the global planning layer) to further assist the platforms in accomplishing their respective goals and tasks and to assist each of the layers in determining goals, actions and functions for respective platforms. In some embodiments and to save bandwidth, the hierarchical layers of the present principles are only able to communicate with an adjacent layer in the hierarchy. For example, in some embodiments, data collected by sensors associated with a platform is acted upon (processed by) the platform control layer. Such information and related processed information can be communicated to the platform planning layer but not directly to the global planning layer. In addition, in such embodiments information determined and processed by the global planning layer can only be communicated to the platform planning layer and not directly to the platform control layer.

In some embodiments, information determined by each respective processing layer of a hierarchy of the present principles can be modified in response to information/data determined with respect to any of the processing layers. For example, in some embodiments, at least one of a determined collective goal for the team of the platforms, a determined at least one respective platform goal for at least one platform of a team of platforms, a determined at respective action for at least one platform, and a determined, respective function for at least one platform can be modifiable in response to information determined by at least one of the platforms, such as collected scene data. For example and as described above, in some embodiments at least some of the platforms of a team of platforms can include sensors (e.g., image sensors) to collect scene information. Determined goals, actions and functions can be modified based on scene information (i.e., such as obstacles, target locations, etc.) collected by a sensor(s) of a respective platform(s). In some embodiments, data/information collected by sensors of at least one platform and processed by the platform control layer can be communicated to the platform planning layer at which the platform planning layer can determine a physical and/or semantic layout of at least a respective environment of the platform(s).

At the platform planning layer, the physical and/or semantic layout of the at least one operating environment can be considered when determining at least one respective action to be taken by a platform of the team of platforms. Such information regarding the physical and/or semantic layout of the at least one operating environment and the determined actions to be performed by platforms can be communicated to the global planning layer to be considered when determining at least one of the collective/global goal for the team of the platforms and the at least one respective platform goals.

In some embodiments, the functionality of the different layers of a HDRL system of the present principles can be performed in parallel. For example, processing of the platform control layer, the platform planning layer, and the global planning processing can be performed in parallel.

Although in some embodiments, information/data collected/processed can be communicated/shared between the hierarchical processing layers of the present principles, in accordance with the present principles, each processing layer is trained independently of every other processing layer. That is, in accordance with the present principles, each hierarchical processing layer of the present principles implements independent processes on respective collected information/data to accomplish the intended purpose(s) of the respective processing layer. For example, in some embodiments, at least the global planning layer and the platform planning layer implement machine learning processes on collected/processed information/data to determine information/data needed to accomplish the intended purpose(s) of the respective processing layer (described in greater detail below). For example, in some embodiments, at least the global planning layer and the platform planning layer implement a policy system, which is able to map states to actions (described in greater detail below).

Figure 2:
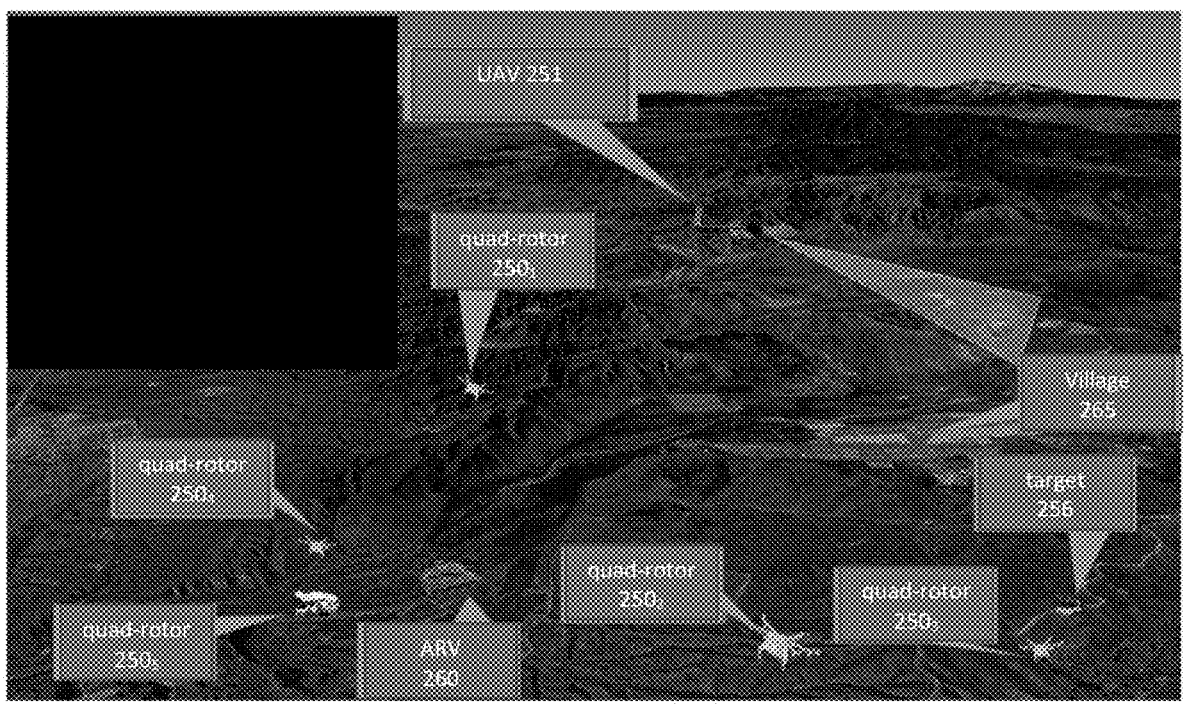
FIG. 2 depicts an embodiment of a military application for an HDRL system of the present principles, such as the HDRL system 100 of FIG. 1, in accordance with an embodiment of the present principles.

FIG. 2 depicts an embodiment of a military environment in which an embodiment of an HDRL system of the present principles, such as the HDRL system 100 of FIG. 1, can be applied. In the embodiment of FIG. 2, a manned ARV 260 is transporting supplies to a target village 265. The military environment of FIG. 2 further includes a team of multi-domain platforms in the form of five quad-rotors $250_1$-$250_5$, and one fixed-wing unmanned, aerial vehicle (UAV) 251. In the embodiment of FIG. 2, an HDRL system of the present principles, such as the HDRL system 100 of FIG. 1, can be implemented to determine a solution for assisting the manned ARV 260 in transporting supplies to the target village 265. For example, in some embodiments an HDRL system of the present principles can determine that a global goal (e.g., mission) of the team of platforms, the five quad-rotors $250_1$-$250_5$, and one fixed-wing UAV 251, can be to escort the manned ARV 260 in transporting supplies to the target village 265. Individually, however, the platforms can be assigned individual goals by the HDRL system of the present principles. For example, in the embodiment of FIG. 2, the high-altitude fixed-wing UAV 251 can, for example, be assigned a first goal of providing a communications hub and a second goal of detecting threats, while the quad-rotors $250_1$-$250_5$ are assigned to provide surveillance over different areas and track targets and return to recharge when necessary. For example, in the embodiment of FIG. 2, the first quad-rotor $250_1$ is assigned a short term goal of searching a Northwestern quadrant of the environment, the second quad-rotor $250_2$ is assigned a short term goal of searching a Northeastern quadrant of the environment, the third quad-rotor $250_3$ is assigned a short term goal of the pursuit of an identified target 256, the fourth quad-rotor $250_4$ is assigned a short term goal of returning to a base to recharge, and the fifth quad-rotor $250_5$ is assigned a short term goal of covering a flank of the ARV 260. The HDRL system of the present principles can then determine actions for each of the platforms of the team of platforms for accomplishing the individual platform goals and can further determine functions (low-level control commands) for each of the platforms for accomplishing the respective, determined actions for each of the platforms. In some embodiments of the present principles, the HDRL system of the present principles then causes respective platforms to perform the determined functions and data/information associated with a performed function can be captured by, for example in some embodiments, sensors associated with at least one platform, and the captured data can be used to determine a subsequent function to be performed by at least one platform of a team of platforms.

As described above, in some embodiments, a HDRL system-based solution for determining and completing the mission goal, the short-term goals of the platforms and the low-level functions of, for example, the military environment of FIG. 2 can be framed as a hierarchical solution in accordance with the present principles.

In some embodiments, such as the embodiment of FIG. 2, the hierarchical solution of the present principles can be divided into three (3) layers: a global planning layer, referred to in the embodiment of FIG. 2 as a Deliberative Autonomy layer, in some embodiments executed by the global planning module 130 depicted in the HDRL system 100 of FIG. 1; a platform planning layer, referred to in the embodiment of FIG. 2 as a Perceptive Autonomy layer, in some embodiments executed by the respective platform planning modules 120 depicted in the HDRL system 100 of FIG. 1; and a platform control layer, referred to in the embodiment of FIG. 2 as a Reactive Autonomy layer, in some embodiments executed by the platform control modules 110 depicted in the HDRL system 100 of FIG. 1. In some embodiments, the individual layers can be trained separately, for example, using machine learning techniques and processes.

As described above, in some embodiments of the present principles, the Deliberative Autonomy layer accomplishes long-term team-level missions including but not limited to, for example in the embodiment of FIG. 2, convoy escort, enemy pursuit, call-for-fire, and search operations. In some embodiments, the Perceptive Autonomy layer accomplishes short-term, single-platform planning goals including but not limited to, waypoint navigation (i.e., move from point A to point B), semantic goal navigation (i.e., finding a military target), semantic area navigation (i.e., finding a place to hide), and exploration. In some embodiments, the Reactive Autonomy layer accomplishes low-level single-platform control and planning including but not limited to, nearby graph node movement (i.e., move to the adjacent location based on a scene graph), detailed movement (i.e., turn left/right 30 degrees, move forward/backward for 2 meters, remain stationary), and information capture (i.e., use a sensor on-board of a platform to capture sensor data of an environment). In accordance with the present principles, each layer of the hierarchical architecture learns the policies that maps situations to actions that can be assigned as tasks for the next layer. In some embodiments, the policies of each layer are learned/trained separately, for example using machine learning techniques and processes describe in greater detail below.

For example and as described above, in some embodiments the Deliberative Autonomy layer is responsible for learning policies (described in greater detail below) for a team mission, such as convoy escort. It generates actions that are assigned as short-term planning goals for each individual platform. Furthermore, in the Deliberative Autonomy layer, a Graph Network (GN) representation can be used to model the team's capabilities and encode team domain knowledge (described in greater detail below). The GN structure enables scaling the team to a varying number of platforms without re-learning. That is, the parameters learned for a team of 10 platforms will be the same as parameters learned for a team of 100 platforms.

In some embodiments, the Perceptive Autonomy layer can learn sequential actions to fulfill each assigned short-term individual-platform goal. The actions can involve moving the platform to an adjacent location based on nearby nodes modeled in the scene graph for the new environment. In addition and as will be described in further detail below, in the Perceptive Autonomy layer, a GN representation can be used to model semantic objects of captured scenes and their relationships in an unknown environment. The Perceptive Autonomy layer can also utilize prior scene domain knowledge GNs to guide the GN in the unknown environment. Even further, the HDRL system of the present principles explicitly learns an adversarial agent (adversarial reinforcement learning) in the Deliberative Autonomy layer, such that during learning, the HDRL system learns not only the rules for protagonist platforms but also learns an adversarial platform. The Perceptive Autonomy layer can then augment an adversary-world model process (described in greater detail below) to enable an individual platform to predict or "hallucinate" the next state of the world or mission given a next action of the platform. In this way, an HDRL system of the present principles can learn to capture the dynamics of the world and the capabilities of an adversarial agent within the world.

Low-level control commands/functions, such as turning left/right 30 degrees and moving forward for 2 meters, are supported by the Reactive Autonomy layer, which learns and executes those actions and commands through functions that can be communicated to platforms to cause at least one platform to perform a determined function for supporting the perceptive autonomy layer.

Figure 3:
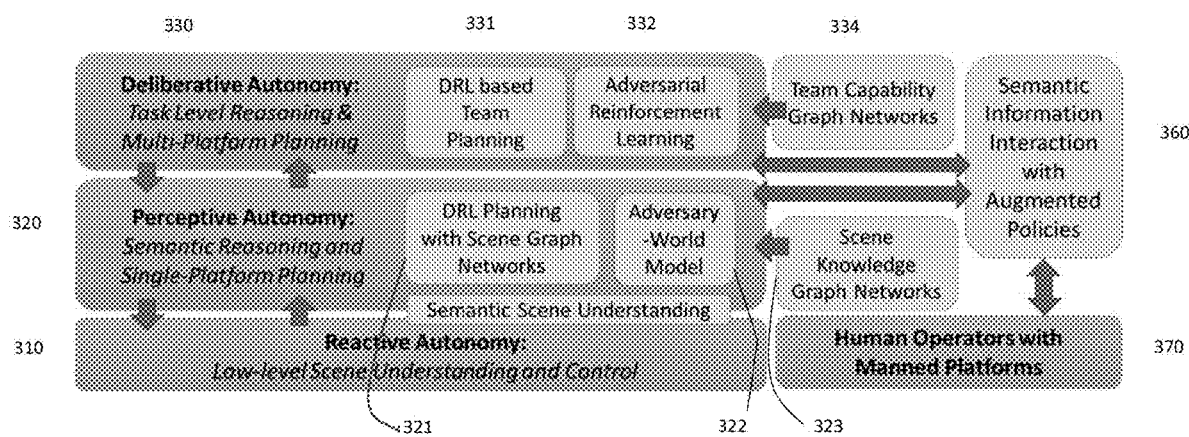
FIG. 3 depicts a high-level functional diagram of a hierarchical architecture of an HDRL system in accordance with an embodiment of the present principles.

FIG. 3 depicts a high-level functional diagram of a hierarchical architecture and exemplary processes of an HDRL system in accordance with an embodiment of the present principles. The hierarchical architecture of FIG. 3 includes a Deliberative Autonomy layer 330, a Perceptive Autonomy layer 320, and a Reactive Autonomy layer 310. In the embodiment of FIG. 3, the Deliberative Autonomy layer 330 includes a DRL-based team planning process 331, a Team capability graphs network process 332 and an Adversarial Reinforcement Learning (RARL) process 334. The Deliberative Autonomy layer 330 receives input from and provides commands to the Perceptive Autonomy layer 320. The Perceptive Autonomy layer 320 of FIG. 3 illustratively includes a DRL planning with scene graphs process 321, an Adversary-world model process 322, and Scene knowledge graph networks process 323 (described in greater detail below). In the embodiment of FIG. 3, the Perceptive Autonomy layer 320 receives input (e.g., semantic scene understanding information) from and provides commands to the Reactive Autonomy layer 310. The HDRL system of FIG. 3 illustratively further includes a Semantic information interaction process 360 and a human resource device 370 for user input or display, which in some embodiments can include an input/output means of computing device, such as the computing device 1200 of FIG. 1 (described in greater detail below). In some embodiments of a HDRL system of the present principles, the Semantic information interaction process 360 can be implemented by any one of the platform control modules 110, the platform planning modules 120, or the global planning module 130.

Deliberative Autonomy Layer
Policy Planning Process

In the embodiment of FIG. 3, the Deliberative Autonomy layer 330 learns and generates policies for multi-platform team planning for long-term mission goals, which have coordinated goals but use decentralized control. The generated policies are then used to assign short-term planning goals for each individual platform. More specifically, in some embodiments of the present principles the Deliberative Autonomy layer of the present principles applies a deep learning policy planning process for learning policies for a team mission.

Figure 14:
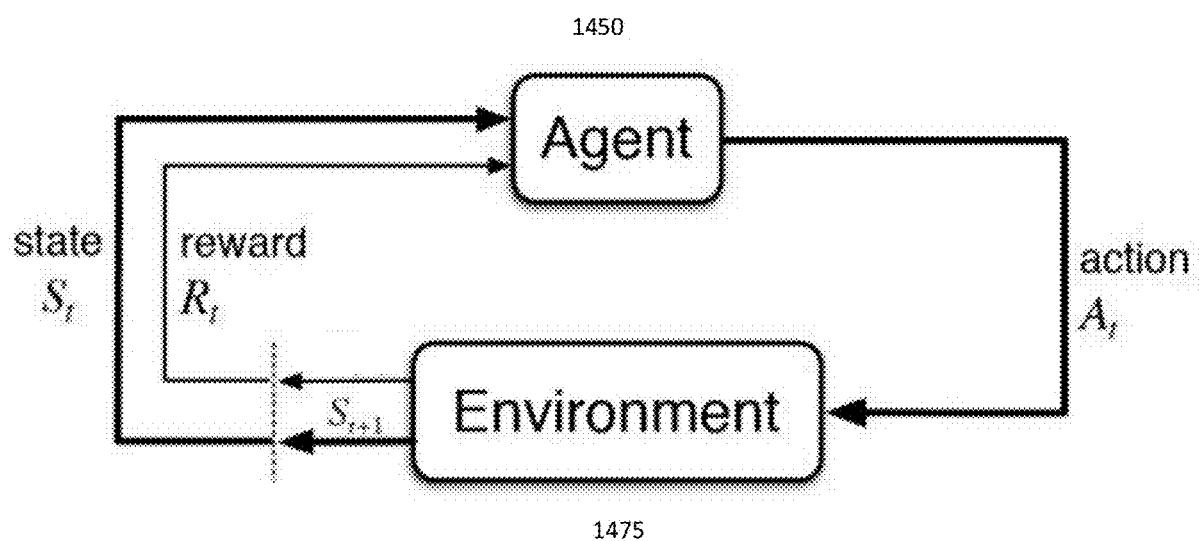
FIG. 14 depicts an example of a deep learning policy planning process in accordance with an embodiment of the present principles.

For example, FIG. 14 depicts an example of a policy planning process 1400 in accordance with an embodiment of the present principles. As depicted in FIG. 14, in a policy planning process 1400 of the present principles a platform/agent 1450 can learn how to achieve a goal through a mapping from situations to actions, by trial-and-error interactions with its environment. More specifically, as depicted in FIG. 14, the platform/agent 1450 can, using a sensor, collect/capture a characteristic of the environment 1475. From the captured characteristic of the environment 1475, a first state, $S_t$, of the environment 1475 can be determined. The platform 1450 can then perform an action, $A_t$, at a first time. The platform 1450 can then collect/capture a characteristic of the environment 1475 after the performed action, $A_t$. From the captured characteristic of the environment 1475, a second state, $S_{t+1}$, of the environment 1475 can be determined. A comparison between the first state, $S_t$, and the second state, $S_{t+1}$, can be made to determine if after performing the action, $A_t$, the platform 1450 is closer to achieving a determined goal. If the platform 1450 is closer to achieving the goal after the action, $A_t$, the platform 1450 is given a reward, $R_t$, to encourage the platform 1450 to continue on a path to achieving the determined goal.

That is, the policy planning process 1400 of the present principles rewards a platform for performing an action which advances an achievement of at least one of a determined collective goal for a team of the platforms, a determined at least one respective platform goal, and a determined at least one respective action for a platform. The policy planning process 1400 can be repeated to improve the actions of the platforms toward achieving a respective goal, action, and/or function. In accordance with the present principles, in the Deliberative Autonomy layer, all platforms execute the same policy system, but rewards for each platform will be the reward of the entire team. In this way, a Deliberative Autonomy layer of an HDRL system of the present principles trains for individual policies that maximize the team's total reward. A DRL-based team planning process of the present principles explicitly encourages the team of platforms to exhibit good team characteristics in performing actions, which can include maintaining good communications, localization, and information sharing.

In some embodiments, the Deliberative Autonomy layer 330 can also leverage (1) a capability GN which expresses the information sharing and platform policy, (2) auxiliary functions which enable graceful prioritization of communications and localization, and (3) adversarial reinforcement learning to improve the learned policies (described in greater detail below).

To increase the level of collaboration among all unmanned/manned platforms, an HDRL system of the present principles can utilize and share semantic information extracted from captured scenes from platforms for interaction across platforms (described in greater detail below). In addition to visualization, scene objects with their geometry can be converted to descriptions of text labels and contextual words as a natural way to inform human operators for situational awareness and decision making. An HDRL system of the present principles can further enable a human operator/user to provide semantic feedback that can be incorporated to augment each of the platform's policies, such as supplementing the scene/team graph knowledge bases (described in greater detail below). This enables feedback and guidance from human operators for the collaborative planning process of an HDRL system of the present principles.

(1) Capability GN

As described above, in some embodiments, the DRL based team planning of the present principles (i.e., as depicted in FIG. 14), which can be implemented by the DRL-based team planning process 331, can be guided by providing team domain knowledge in the form of Team Capability Graph Networks (GN) 332. GNs reduce the number of parameters and the amount of training data required. GNs comprise a neural network variant, capable of modeling non-local connections in data. Such models are particularly useful for performing typical machine learning tasks, such as classification, on naturally graph-structured data and comprise a means of incorporating inductive biases regarding class-to-class or object-object relationships into deep neural networks in much the same way convolutional neural networks incorporate inductive biases about local pixel relationships.

Figure 4:
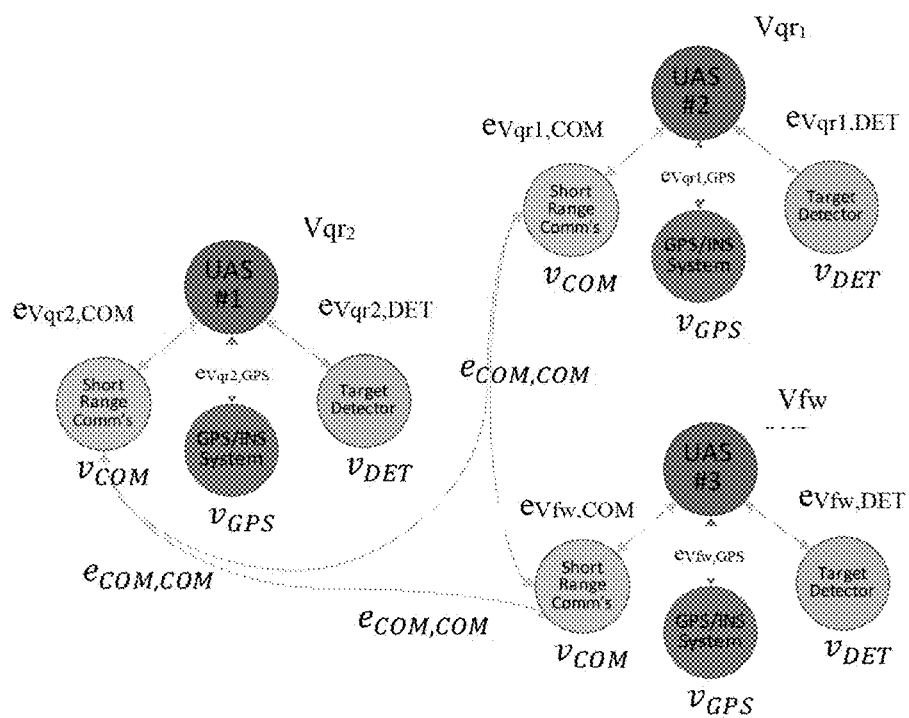
FIG. 4 depicts a graphical representation of a formulation of a Team Capability Graph in accordance with an embodiment of the present principles.

In the embodiment of FIG. 3, the GN 332 is implemented as a powerful representation for reasoning and learning, enabling a decomposition of a Deep Neural Network (DNN) and to train re-usable components for different situations. Graph nodes of the GN 332 represent capabilities associated with a platform, while edges represent possible constraints associated with communications/data sharing links. For example, FIG. 4 depicts a graphical representation of the formulation of the GN 332 in accordance with an embodiment of the present principles. The GN 332 of FIG. 4 is formulated for an HDRL system of the present principles, which includes three (3) platforms, two quad-rotor platforms, $Vqr_1$ and $Vqr_2$, and one fixed-wing platform, Vfw. In the embodiment of FIG. 4, each vertex, V, in the graph is associated with a respective capability of one of the platform nodes, $Vqr_1$ and $Vqr_2$, and Vfw. For example for each platform node, a $V_{COM}$ node represents respective hardware of each platform capable of exchanging information between the platforms for short-range communications; a $V_{GPS}$ node represents respective localization and navigation capabilities of each platform; and a $V_{DET}$ node represents respective hardware and algorithms of each platform having mission specific capabilities (e.g., long-range sights, target detection, etc.).

In the embodiment of FIG. 4, edges, e, between the vertices represent data sharing capabilities. For example, in FIG. 4, for each of the platform nodes, $Vqr_1$ and $Vqr_2$, and Vfw, an edge, $e_{Vqrn,COM}$ exists between the platform node and the communications node, $V_{COM}$. In addition, in FIG. 4, for each of the platform nodes, $Vqr_1$ and $Vqr_2$, and Vfw, an edge, $e_{Vqrn,GPS}$ exists between the platform node and the localization and navigation node, $V_{GPS}$, and an edge, $e_{Vqrn,DET}$ exists between the platform node and the mission specific node, $V_{DET}$. It should be noted that in the embodiment of FIG. 4, the only edges, $e_{COM,COM}$ between platforms are associated with communications capabilities. For example, in the embodiment of FIG. 4, $e_{COM,COM}$ exists between short range communications vertices of each of the platform nodes, $Vqr_1$ and $Vqr_2$, and Vfw, and provides for information sharing.

Figure 5:
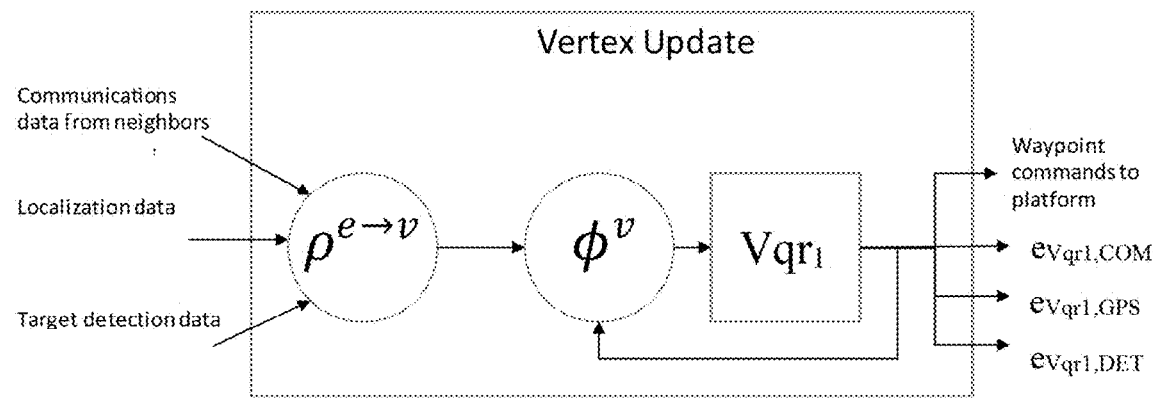
FIG. 5 depicts a graphical representation of a Vertex update procedure in accordance with an embodiment of the present principles.

As depicted in FIG. 4, a capability graph network is a collection of vertices, $v_i$, and edges, $e_k$, in which vertices can represent a state associated payload and edges can represent possible constraints in the system. During each time step of the planning, update functions are used to update the parameter vectors associated with $v_i$ and $e_k$. In some embodiments, following the GN approach, an update can occur in two stages: a Vertex update procedure and an Edge update procedure. FIG. 5 depicts a graphical representation of a Vertex update procedure 500 in accordance with an embodiment of the present principles. In the Vertex update procedure 500 of FIG. 5, previous edge vectors and previous vertex vectors of a respective platform serve as inputs and are modified by learned functions $\rho^{e \to v}$ and $\phi^v$, and provide an updated vertex vector. That is, in the Vertex update procedure 500 of FIG. 5, $\phi^v$ and $\rho^{e \to v}$ express how the vertex parameters are updated via previous values and the values of all incoming edge parameters.

Figure 6:
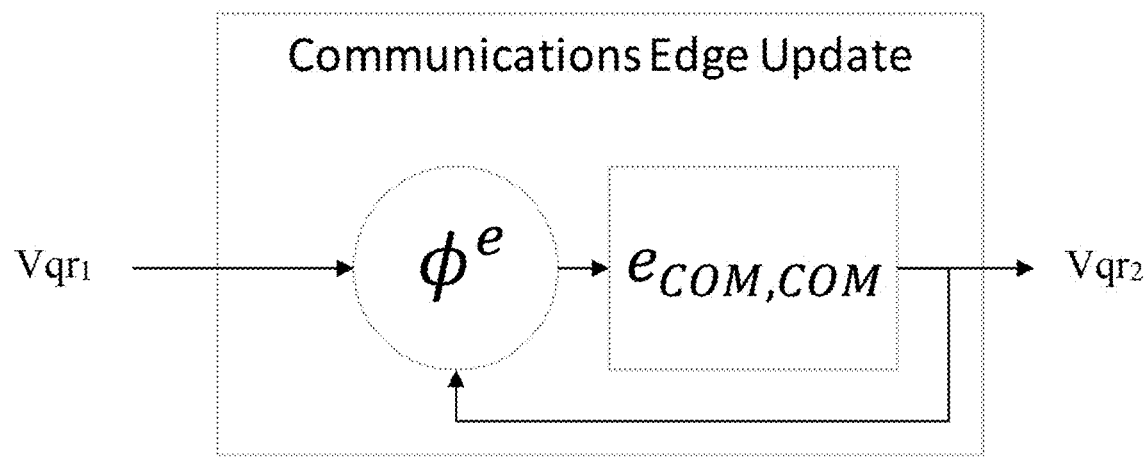
FIG. 6 depicts a graphical representation of a Communications Edge update procedure between a source platform and a receiver platform in accordance with an embodiment of the present principles.

FIG. 6 depicts a graphical representation of a Communications Edge update procedure 600 between a source platform and a receiver platform in accordance with an embodiment of the present principles. In the Communications Edge update procedure 600 of FIG. 6, the source vertex vector for the source platform (illustratively $Vqr_1$) serves as input and is transformed by $\phi^e$. The updated edge parameters are provided to the vertex vector of the receiver platform (illustratively $Vqr_2$), which is then updated. That is, in the Communications Edge update procedure 600, $\phi^e$ expresses how the edges evolve as a function of the previous edge value and the values of source and receiver nodes.

Thus, with respect to the Vertex update procedure 500 of FIG. 5 and the Communications Edge update procedure 600 of FIG. 6, for each type of vertex-edge-vertex tuple, three functions: $\phi^e$, $\rho^{e \to v}$, and $\phi^v$ are learned. These functions, in accordance with the present principles, are significantly simpler than trying to learn one function to evolve the entire system. The GN structure enables the reduction of the number of functions by using domain knowledge to allow only certain types of connections (i.e., tuples). In some embodiments of the present principles, the collection of $\theta = \{\phi^e, \rho^{e \to v}, \phi^v\}$ functions can be learned via DRL (i.e., each function is approximated with a deep neural network trained via reinforcement learning). It should be noted that although FIG. 5 and FIG. 6 are depicted with a specific type of data collected by a respective platform, in accordance with the present principles a Vertex update procedure 500 and a Communications Edge update procedure 600 of FIG. 6 can be applied to substantially any data determined by a respective platform including but not limited to localization data and target detection data.

(2) Auxiliary Functions

In the disclosure above, $\theta$ is introduced as the set of all parameters describing the transfer functions of the GN. These functions determine what action the platforms can execute and, so, define a policy, $\pi(\theta)$. In a typical policy gradient RL, the set of parameters $\bar{\theta}$ that maximize the expected reward over all time can be found according to equation one (1), which follows:

$$\bar{\theta} = \arg\max_{\theta} \mathbb{E}_{\pi(\theta)}[R_{1:\infty}] \quad (1)$$

In accordance with the present principles, with auxiliary tasks, policies $\pi^a(\theta^a, \theta)$ which achieve the auxiliary tasks $a \in A$, but use both the parameters $\theta$ of the main policy and independent parameters, $\theta^a$, can independently be searched. The shared parameters force an HDRL system of the present principles to build policies, $\pi$, which benefit from learning done to build the auxiliary policies $\pi^a$, for example according to equation two (2), which follows:

$$\bar{\theta} = \arg\max[\mathbb{E}_{\pi(\theta)}[R_{1:\infty}] + \Sigma_{a \in A}\mathbb{E}_{\pi^a(\theta^a,\theta)}[R^{a1:\infty}]] \quad (2)$$

Thus, an HDRL system of the present principles can be encouraged to transfer learning from the auxiliary task to the primary task. In the following sections, several auxiliary tasks are described: estimating the target's position (EST), localizing the platform (LOC), maintaining communications (COMM), and synchronizing with other platform members (SYNC). Several primary capabilities of the platforms relating to understanding and shaping an adversary are described.

Estimating the Position of the Targets

The purpose of estimating auxiliary goal is to encourage at least one platform of an HDRL system of the present principles to estimate the location of the target. In each platform's parameters, $\mathbb{T}_v$, represents an embedding describing the locations of the targets. Embedding as used herein represents low-dimensional, dense representations of higher-dimensional sparse data, which have become an extremely powerful tool in machine learning tasks across many domains. Embodiments of the present principles utilize embeddings to learn hierarchical and composable embeddings of textual data and of multi-dimensional attributes, for example, for graph-structured data composing node embeddings from graphs, etc. In embodiments in which $\mathbb{T}_v$ is an N×N heat map, then it is expected that $\mathbb{T}_v$ has peaks associated with each target location. In such embodiments, a simulator can be implemented that has ground truth positions of the targets, and a reward can be computed according to equation three (3), which follows:

$$R^{EST} = -|\mathbb{T} - \mathbb{T}^v| \quad (3)$$

In accordance with equation three (3) above, the system is rewarded when the true and estimated location of the target match. It is important to note that, although in some embodiments each platform maintains a copy of $\mathbb{T}^v$ in its vertex parameters, it is not required that each individual platform estimate the location of every target. It is expected, however, that competing rewards will encourage the platforms to share information via the communications edges.

Localization and Communication

For localization and communication, the platforms are encouraged to localize themselves and maintain communications with other members of a team. Such capabilities are important to any surveillance operation. In some embodiment, $\mathbb{L}$ represents an embedding associated with the ground truth position of a platform provided by a simulator. If the embedding is an N×N grid map, then the map would have a single peak at the true position of the platform and a reward can be computed according to equation four (4), which follows:

$$R^{LOC} = -|\mathbb{L} - \mathbb{L}^v| \quad (4)$$

$R^{LOC}$ is negative when the estimate of the pose of a respective platform deviates from the true pose and the system is incentivized to correctly localize itself. A similar reward function exists for $\mathbb{A}$ and $\mathbb{O}$, in which $\mathbb{A}$ represents an embedding describing the areas under surveillance by a respective platform and $\mathbb{O}$ represents an embedding describing the obstacles in the environment. In such embodiments, a reward function exists, similar to the reward function of equation four (4), to encourage the estimated coverage to match the true coverage and obstacles, respectively.

In some embodiments of the present principles, SHORTRANGE is defined as a function which returns the estimated strength of a communications transceiver given the positions of a respective platform. Reward policies that encourage the i-th and j-th platforms at the optimal distance for communications can be defined according to equation five (5), which follows:

$$R^{COMM} = \text{SHORTRANGE}(\mathbb{L}_i, \mathbb{L}_j) \tag{5}$$

Synchronization

In some embodiments it is beneficial to encourage platforms to share information. In at least some embodiments, the sharing of information can be accomplished through the edge communications (e_(COM,COM)) as depicted in FIG. 4 described above. The synchronization task encourages platforms to synchronize maps, positions of other platforms, engagement state, etc. If $v_i$ is defined as the vertex parameters for the i-th platform and $v_j$ is defined as the vertex parameters for the j-th platform, then a reward can be computed according to equation six (6), which follows:

$$R^{SYNC} = \Sigma_{(i,j)} - |v_i - f(v_j)| \tag{6}$$

The reward computed in accordance with equation six (6) encourages the parameters of the i-th and j-th platforms to match. Importantly, achieving such a match requires that an HDRL system of the present principles learns to communicate its state over the communications channels (i.e., the only link between platforms of the system). In equation six (6) the function, f, rearranges the terms of the parameter vector, for example, so that the pose of the i-th platform is not compared to the pose of the j-th platform, and so on.

Escort Surveillance and Target Localization

In some embodiments, the auxiliary goals described herein are used to train policies which coincide with an HDRL system's primary goals, such as escort surveillance and target localization in the embodiment of FIG. 2. As described above, the primary policy will share parameters with the auxiliary policies and provide a means for knowledge transfer. If effective, in some embodiments a respective platform can have the ability to estimate parameters, including but not limited to, the platform's location, $\mathbb{L}$, estimated target positions, $\mathbb{T}$, a coverage area, $\mathbb{A}$, locations of obstacles, $\mathbb{O}$, a platform's destination/next waypoint, $\mathbb{D}$, and, in the embodiment of FIG. 2, a location of the ARV, $\mathbb{V}$. In some embodiments, $\mathbb{F}$ remains unconstrained so that the policy can implement the free parameters as part of the learning.

In some embodiments, such as the embodiment of FIG. 2, an HDRL system of the present principles is rewarded when the true coverage of the system, $\mathbb{A}$, and a location of the ARV, $\mathbb{V}$ overlap with the target locations $\mathbb{T}$, according to equation seven (7), which follows:

$$R^{SUR} = \Sigma \mathbb{A} \times \mathbb{T} \times \mathbb{V} \tag{7}$$

In equation seven (7), the multiplication is element-by-element and rewards coverage for targets near the ARV.

(3) Adversarial Reinforcement Learning

In some embodiments, adversarial training can be applied to find "difficult" examples and stress the collaborative planning. For example and with reference back to FIG. 3, in the Deliberative Autonomy layer 330, adversarial reinforcement learning methods which leverage DRL to simultaneously train an adversary seeking to attack the system or any independent platform not part of a team of platforms can be implemented. That is, in some embodiments a Robust Adversarial Reinforcement Learning (RARL) process 334 can be implemented by the Deliberative Autonomy layer 330 for learning a policy for the platforms and an adversarial policy. In some embodiments, the RARL process 334 can optimize a group policy π of the platforms (referred to herein as protagonist platforms) of a hierarchical DRL system of the present principles with parameters θ while holding the adversarial policy $\pi^{adv}$ with parameters $\theta^{adv}$ fixed. Then, after several iterations, $\theta^{adv}$ is optimized and θ is held fixed. The RARL process 334 can improve the protagonist platforms because the adversarial policy $\pi^{adv}$ is engaged in a zero-sum game with the protagonist platforms. As such, the RARL process 334 seeks to find "hard" examples for the protagonist platforms during training and forces the protagonist platforms to improve. Considering the above described reward functions for the protagonist platforms, the reward for the adversarial platforms can be considered as the sum of the negative of the rewards from every platform. In other words, an adversarial platform receives a reward when any protagonist platform loses reward.

Figure 7:
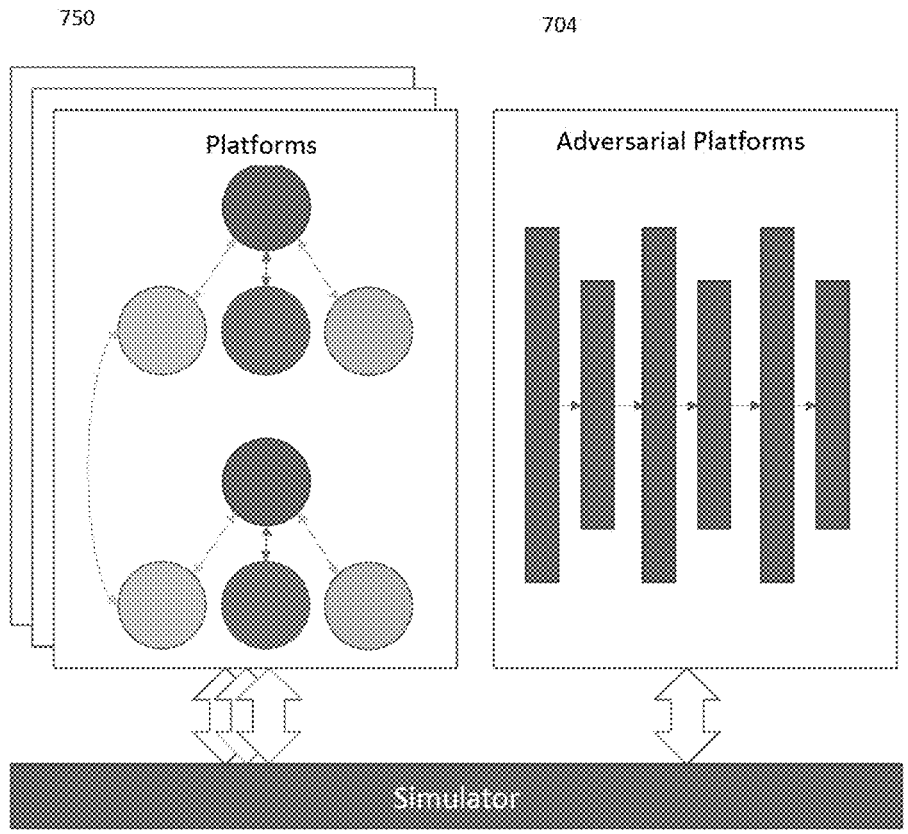
FIG. 7 depicts a graphical representation of a zero-sum game between the adversarial policy and protagonist platforms in accordance with an embodiment of the present principles.

FIG. 7 depicts a graphical representation of a zero-sum game between the adversarial policy and the protagonist platforms in accordance with an embodiment of the present principles. In FIG. 7, as the GN is learned for each protagonist platform 750 (left), an adversarial platform 704 (right) is also learned. This adversarial platform 704 engages in a zero-sum contest with the protagonist platforms 750. That is in some embodiments, the protagonist platforms are rewarded for, for example, expanding an area of surveillance, while the adversarial platform attempts to reduce it. Thus, the process seeks to find "hard" examples for the protagonist platforms during training and forces the protagonist platforms to improve. The reward for the adversarial platform is the sum of the negative of the rewards from every platform. In other words, the adversarial platform receives reward when any protagonist platform loses reward.

In some embodiments, two approaches can be used by the Simulator 706 for modelling the adversarial policy parameter, $\theta^{adv}$: a Deep Neural Network approach and a Graph Network approach. For a Deep Neural Network (e.g., CNN, RNN, etc.) approach, an adversarial platform is given "godlike" powers. For example, the Deep Neural Network can arbitrarily eliminate some number of platforms, arbitrarily degrade a communications channel, or teleport a target to an un-surveyed area. It is expected that the adversarial power to eliminate platforms will make the policy robust to attrition during deployment. Importantly, the adversarial platform 704 can simply "stress" the protagonist platform 750 without considering how the stress is accomplished (i.e., the Deep Neural Network can degrade communications between the platforms without having to have a jammer in the area). Of course, the adversarial platform 704 must have limits (e.g., it cannot eliminate all the platforms at once). These limits force an HDRL system of the present principles to find and exploit weaknesses in the protagonist platform policy.

In the Graph Network (GN) approach, the adversarial platform 704 acts analogously to a notional target. The target has assets with capabilities which can be deployed against the protagonist platforms and is essentially a mirror of the protagonist platform architecture. This approach models an adversary's actions given its capabilities. For example, in the embodiment of FIG. 2, the UAV 251 could be shot down at any time. The assumption can be unrealistic, however, if the target is not sufficiently close to the UAV 251. The GN adversarial approach, of FIG. 7 however, requires the simulator 706 to be aware of models of the adversary's assets.

Perceptive Autonomy and Reactive Autonomy Layers

The Perceptive Autonomy layer 320 of FIG. 3 supports the planning and control for goals assigned by the Deliberative Autonomy layer 330 for each individual platform. In some embodiments, the Perceptive Autonomy layer 320 learns and generates policies for individual planning for multi-domain platforms to determine actions to be performed by individual platforms to achieve short-term planning goals assigned by, for example, the Deliberative Autonomy layer 330. The generated policies are then used to assign control functions for each individual platform to perform the determined actions. More specifically, in some embodiments of the present principles the Perceptive Autonomy layer 320 of the present principles applies a deep learning policy planning process, similar to the policy planning process 1400 of FIG. 14, for learning policies for short-term planning goals of each of the platforms. In such embodiments, a difference between a policy planning process of the Deliberative Autonomy layer 330 and the Perceptive Autonomy layer 320 is that the actions performed in a policy planning process of the Perceptive Autonomy layer 320 are actions intended to achieve short-term goals of the platforms instead of actions intended to achieve a global/collective goal for the team of platforms as in the policy planning process of the Deliberative Autonomy Layer 330

In some embodiments, the Perceptive Autonomy layer 320 can extract and incorporate 3D semantic scene information from a current environment (described in greater detail below) to, for example, improve the results of a policy planning process performed by the Perceptive Autonomy layer 320. In some embodiments, the 3D semantic scene information of the new environment can be modeled via scene GNs to improve DRL planning during the mission. The scene GNs can cover hierarchical representations of the modeled scene, ranging from coarse scene layouts (i.e., ground and building walls) to fine-level semantic objects (i.e., building windows and egress points). As previously described above, graph nodes represent objects and layouts, while edges represent geometric relationships among nodes. Scene knowledge GNs can be used to guide the DRL policy planning for individual platforms, by, in some embodiments, associating and adapting current scene graphs with scene knowledge GNs. The scene knowledge GNs represent the mission-related knowledge encoded with scene elements. For example, a sniper can hide beyond an open window of the building and, as such, behind a tree can be a suitable place to hide for the platforms for surveillance.

Figure 8:
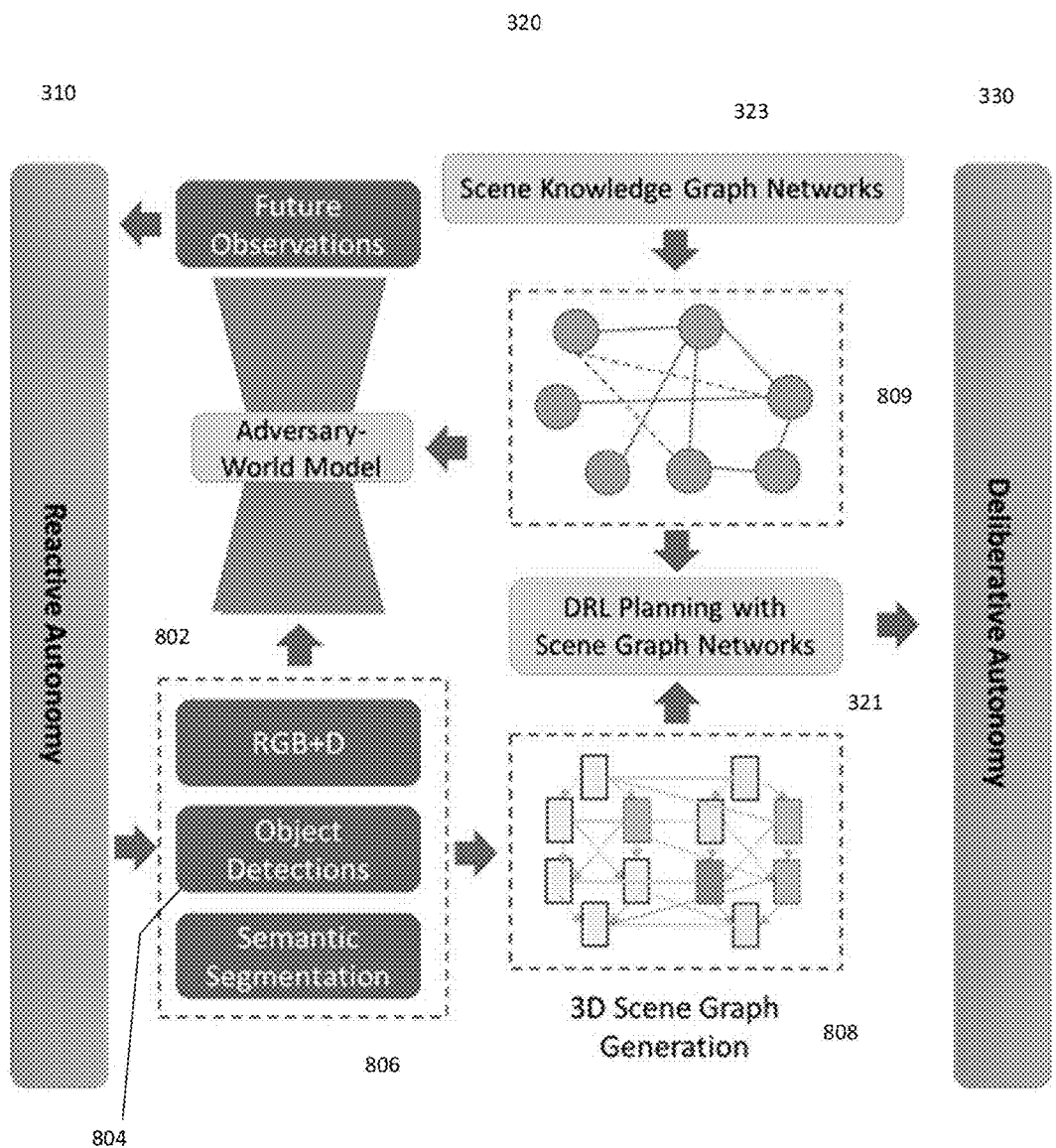
FIG. 8 depicts a high-level functional diagram of the Perceptive Autonomy layer 320 of an HDRL system in accordance with an embodiment of the present principles.

FIG. 8 depicts a high-level functional diagram of the Perceptive Autonomy layer 320 of, for example, the HDRL system as depicted in FIG. 3 in accordance with an embodiment of the present principles. The Perceptive Autonomy layer 320 of FIGS. 3 and 8 includes a DRL planning with scene graphs process 321, an Adversary-world model process 322, and a Scene knowledge graph networks process 323. As depicted in FIG. 8, the Perceptive autonomy layer provides an interchange between the low-level Reactive Autonomy layer 310 (left) and the high-level Deliberative Autonomy layer 330 (right).

As depicted in the embodiment of FIG. 8, the Perceptive Autonomy layer 320 can receive processed scene data, including but not limited to, detected object information 804, and semantic segmentation information 806 from the Reactive autonomy layer 310. In some embodiments and as depicted in FIG. 8, the Perceptive Autonomy layer 320 can also access raw sensor data, such as RGB imagery with depth maps 802, from the platforms if needed. In some embodiments, the Reactive Autonomy layer 310 can run pre-trained deep semantic segmentation or object detection networks to label objects and scene layouts automatically (described in greater detail below). To speed up the learning process for the Perceptive Autonomy layer 320, in some embodiments the ground truths of semantic scene segments and objects available from the simulation framework can also be used for a training process (described in greater detail below).

In the embodiment of FIG. 8, the Perceptive Autonomy layer 320 generates the 3D scene graph 808 to model the perceived scenes of new environments on the fly. The Perceptive Autonomy layer 320 of a platform can also incorporate scene knowledge via GNs 809 from, for example, Scene knowledge graph network process 323 from, for example, other platform sensor sources or through pre-defined or accumulated mission knowledge related to relevant scene components. By adapting and matching a current 3D scene graph to the scene knowledge GNs, the Perceptive Autonomy layer 320 can infer useful and relevant scene knowledge to guide and to improve DRL planning for supporting the short-term individual-platform planning task assigned from the Deliberative Autonomy layer 330.

In some embodiments, the Perceptive Autonomy layer 320 can also concurrently learn an adversary-world model by using processed scene information and relevant scene knowledge. Through interactions between actions from the Perceptive Autonomy layer 320 and the 3D environment, inferences from the Adversary-world model process 322 can generate new information about predicted future location of adversaries. That is, in the Perceptive Autonomy layer 320, an adversary-world model process 322 can be augmented to enable an individual platform to predict or "hallucinate" the next state of the world or mission given its next action. In some embodiments, the adversary-world model process 322 uses a generative recurrent neural network to train an internal world model, including adversaries, in an unsupervised manner. In this way, an HDRL system of the present principles can learn to capture the dynamics of the world and the capabilities of an adversarial/independent platform, within it. Each platform can then perform immediate, short-term action planning, update its model of the world and predict the next actions of adversary/independent platforms.

In some embodiments, to fully utilize the information from the Reactive Autonomy layer 310, semantic scene reasoning can be enabled for efficient planning of each platform. That is, each platform can provide innovative real-time 3D semantic scene understanding capabilities by combining its state-of-the-art multi-sensor localization and mapping capability and cutting-edge deep semantic segmentation technique to generate sematic labels of trained object classes (such as car, building, tree) for each video frame captured by, for example, respective platforms. The deep semantic segmentation technique can also incorporate motion cues from video to obtain more consistent and accurate semantic labels from video. The method can also predict the semantic labels for future frames based on motion cues from video.

In some embodiments, during a mission, mapped visual points from 2D images and 2D semantic segmentations of images/video captured by platforms are accumulated as 3D point clouds. 3D primitive shapes (i.e., planes or object models) are then fit on 3D sparse point clouds based on their semantic classes. In this way, a dense 3D semantic model for current perceived environments can be built automatically.

As depicted in FIG. 8, the Reactive Autonomy layer 310 is not only responsible for low-level control and locomotion, but also processes low-level visual inputs (i.e., RGB camera images and depth sensing) to extrapolate to scene semantics. In some embodiments and as depicted in FIG. 8, the Reactive Autonomy layer 310 can communicate with the Perceptive Autonomy layer 320 via processes including, but not limited to, a dense 3D semantic model, object detection proposals, and fused RGB+D point observations.

In some embodiments, at training time (i.e., implementation of the deep learning policy planning process), information, for example information from the Reactive Autonomy layer 310, can be learned/sensed, using models trained to perform the specific low-level semantic tasks from raw visual inputs from the real environment, or drawn directly from a simulation environment, such as Habitat-Sim and CARLA, if the training is via simulation, in which case a graphics engine can directly provide information about objects in the scene and their appearance to higher layers.

In the DRL planning with scene graphs process 321 of FIGS. 3 and 8, a 3D dense semantic model can be converted into a GN representation (nodes and edges represent objects and their geometric relationships). The GN, such as a scene GN, improves the efficiency of learned DRL policy planning process for individual platform exploration scenarios. In addition, in some embodiments to increase exploration coverage while avoiding obstacles during the mission, the scene graph enables automatically moving a respective platform to positions that gather more information about semantic entities that can correspond to target objects.

Figure 9:
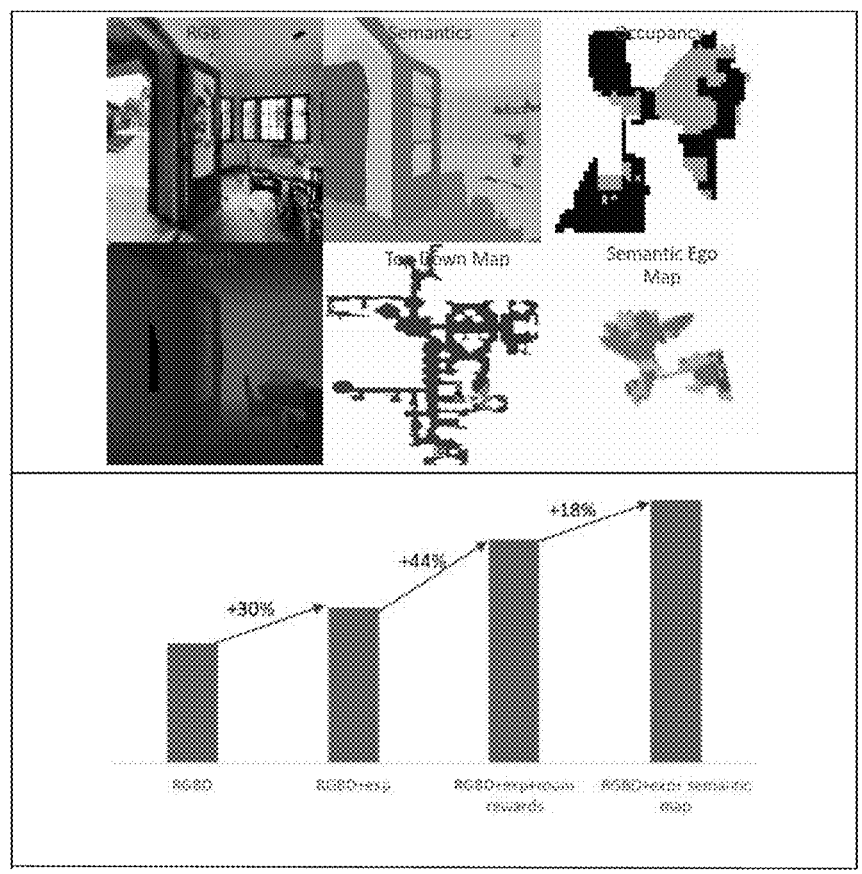
FIG. 9 depicts a pictorial representation of the demonstration of learned DRL policies for single-platform exploration in a new environment in accordance with an embodiment of the present principles.

FIG. 9 depicts a pictorial representation of the demonstration of learned DRL policies for single-platform exploration in a new environment in accordance with an embodiment of the present principles. Using RGBD video input, semantic information is extracted to map and classify new environment (top), which improves the efficiency to achieve the goal of reaching a target location without having a prior map of the area (bottom). In the embodiment of FIG. 9, increasing the semantic awareness of the model, such as encouraging exploration or entering new areas (i.e., exp/room rewards) or providing maps keyed with perceived object classes can increase a performance of learned DRL policies by almost 50%.

In the embodiment of FIG. 9, the modeling of semantic scene entities improves the efficiency of learned policies for single-platform exploration scenarios as shown. Replacing the platform's environment observations with a scene graph, rather than pixels, has the additional benefit of allowing the model to operate with a hierarchy of the scene. For example, when a platform is in a confined space, indoors, or moving at a low speed, the platform may only need to operate on a scene graph representing relationships between local, nearby objects, such as walls, doors, or the next several meters of hallway. In a larger space, or at higher speeds, the objects in the scene graph and the 3D positions represented can also be of a higher scale. A platform performing surveillance in a city block may only need to be aware of the intersections of streets, building ingress and egress points, and dynamic objects, while an aerial platform at high altitude may be operating with a graph of visible populated areas and distant potential targets. Alternatively or in addition, in some embodiments, by decoupling reactive autonomy and perceptive autonomy and allowing feedback via the GN that is learned at the perceptive layer, the flexibility and types of environments in which the model is able to operate is greatly increased.

Figure 10:
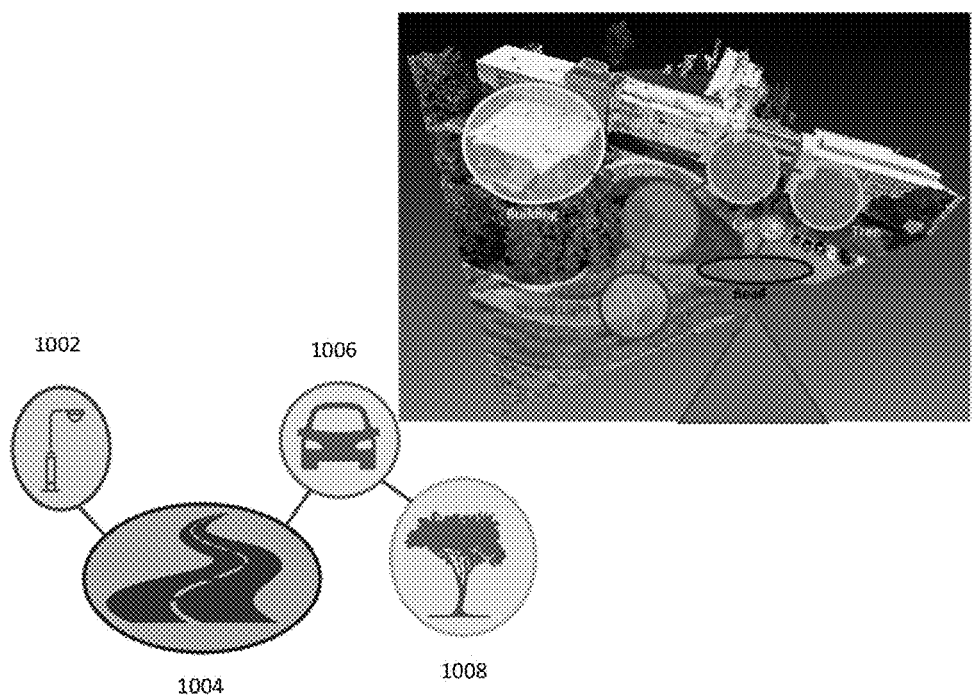
FIG. 10 depicts an example of the generation of a graph structure of an outdoor area in accordance with an embodiment of the present principles.

In embodiments of the present principles, the graph generation/prediction process can be accumulated over several of a platform's observations. For example, FIG. 10 depicts an example of the generation of a graph structure of an outdoor area in accordance with an embodiment of the present principles. That is, as a platform moves in an environment, there are instances in which the platform cannot sufficiently view each object. For example, a building façade can be obscured by trees or a lamppost hidden around a corner. Thus, to ensure that the platform can correctly reason about the 3D spatial relationship of each of the scene's objects that the platform observes, the platform can maintain a memory of its past several observations. For example and as depicted in FIG. 10, the platform stores images related to a lamppost 1002, a section of road 1004, a car 1006 and a tree 1008 previously observed/captured by the platform.

Each platform, given such a sequence of views of the predicted 3D semantic model from the Reactive Autonomy layer of the present principles, extracts the relevant objects or semantic regions, along with an estimate of the global pose of each objects or semantic regions. From there, pairwise spatial relationships between all objects and regions can be computed to generate a complete graph of the scene geometry, where each edge corresponds to the relative pose between two objects or regions. However, even at this level, many of these edges can be either irrelevant (i.e., the platform need not record that everything in a room is below its ceiling) or heavily redundant (i.e., all of the equipment being carried by a vehicle is necessarily adjacent to the same object the vehicle is adjacent to). Thus, in some embodiments, a specially designed recurrent GN can be used that can learn to prune such a generated graph and predict proper labels for each edge that represent a spatial-semantic relationship between objects (i.e., "on," "above," "same plane," "surrounding," etc.)

Referring back to the Perceptive Autonomy layer 323, in the Scene knowledge graph networks process 323 of FIGS. 3 and 8, to further increase the representative power of a scene graph representation, the graph can be aligned with scene knowledge graphs that incorporate prior domain knowledge about the scene or task. In some embodiments, such knowledge bases can be primarily composed of entities and attributes. In accordance with the present principles, an entity can be defined as a discrete object or semantic region of a scene and an attribute can be defined as any mission-relevant descriptor of an entity, such as its capabilities or other descriptors. These entity-attribute relationships, that assemble a knowledge base, can be determined from prior domain knowledge, learned/extracted by a platform via exploration of past environments, or entered by users or domain experts, in some embodiments, in the form of logical triplets (e.g., subject, object, predicate). The platform leverages its existing work on GNs to extract action-to-action specific knowledge from the graph-defined knowledge base, which can then be aligned with the above-described 3D scene graph to infer more semantically aware, task-relevant object-object relationships. When entities are observed by the platform in a new scene, the current observations can then be matched to a subgraph of the knowledge base. The features from the current observations can be fused with the information encoded in the knowledge base to form a composite representation of the scene graph nodes, which correspond to each entity or scene region.

The generated model can then use one of several graph readout operations, such as concatenating nodes or summation, to extract a global, current scene feature from the graph. As such, representations of entities are modeled beyond the space of pixel observations by incorporating prior knowledge about each entity's known attributes and respective spatial configurations into a platform's observation of the scene as a whole. This scene-graph-level feature can then be processed by the platform's policy network to predict a next maneuver. After performing an action and constructing such a representation of the scene/environment, the Perceptive Autonomy layer 320 can then communicate its feedback to the other layers (e.g., the Deliberative Autonomy layer 330 and the Reactive Autonomy layer 310) of an HDRL system of the present principles. For example in some embodiments, success of most recent actions or further commands for low-level control and perception of for example the Perceptive Autonomy layer 320, can be passed down to the Reactive Autonomy layer 310 to coordinate future environmental observations and functionality (i.e., movement of platforms and capture of data). In addition, in some embodiments, the Perceptive Autonomy layer 320 can also communicate information about its status with regard to the overall mission, such as its accomplishment of short-term mission goals or information derived from an adversary model (described below), to the Deliberative Autonomy layer 330.

Referring back to the Perceptive Autonomy layer 323, the Adversary-world model process 322 of FIGS. 3 and 8, can be implemented to increase the robustness of the platforms to adversaries and learn independent platforms and enables a platform to better model the state of the environment. That is, in some embodiments, the Adversary-world model process 322 attempts to iteratively predict a next state of the world, incorporating adversaries, independent platforms, and/or current threats, using its current observations. That is, the Adversary-world model process 322 applies a one step ahead prediction technique using a generative recurrent neural network to learn an internal world model, including adversaries, in an unsupervised manner. Such a model can learn to capture the dynamics of the world and the capabilities of the other platforms. In some embodiments, a platform learns a latent representation of the world and adversaries through an encoder-decoder architecture, by which the current world and adversary observations are encoded into a dense vector representation, which is then decoded into a prediction of the next world state (as depicted in FIG. 8).

In some embodiments of the present principles, to constrain the modeling task, the Perceptive Autonomy layer of the present principles is allowed to learn a static threat map. In such embodiments, much like the platforms can accumulate an obstacle map over several observations, the platforms are also able to generate a map of potentially dangerous areas, given past observations and predicted future threats. For example in some embodiments, a platform can learn to avoid large open areas or plazas in urban environments, preferring to maintain cover along buildings, for the purposes of self-preservation. In addition, in some embodiments a prediction of more expressive, semantic modeling of the world state can be used. That is, in some embodiments a platform can predict how the platform's scene graph representation of the world can evolve across time. This constrains the model to maintain a physically plausible representation of the world in a compact form.

In accordance with the present principles, a latent vector representation of a scene graph encoder-decoder model can be easily integrated with the domain knowledge of the scene or task as produced by the scene knowledge GN. Such integration enables each platform's model of the world state to be influenced by (and reincorporated into) the prior knowledge, thereby strengthening the platform's capabilities. Furthermore, as a platform learns to predict the upcoming state of the world, new platforms can also be trained to be more robust to environmental changes, using their own "hallucinations" of the world scene graph. Outputs of the decoder can be treated as future inputs/observations, decoupling the training of platforms from a simulator, such as Habitat-Sim and CARLA if the training is via simulation, and a Reactive Autonomy layer of the present principles.

Some embodiments of the present principles further enable a user to provide inputs to and receive information from a HDRL system of the present principles, such as the HDRL system 100 of FIG. 1. For example and with reference back to FIG. 3, an HDRL system of the present principles can include a human resource device 370 (i.e., user interface) for enabling a user to provide inputs to and receive information from a HDRL system of the present principles. That is and as described above, a user interface from, for example, the computing device 1200, can be used by a user to input information that is to be considered when determining at least one of the collective goal, the respective platform goals, the respective actions, and the respective functions. In addition, in some embodiments, information determined by at least one platform, such as semantic information (graph representation) extracted from a scene can be converted to text or other medium that is understandable to a human operator. That is, in some embodiments, scene objects with their geometry can be directly converted to descriptions of text labels and contextual words to inform a human operator for enabling situational awareness and decision making.

In such embodiments, human operators and an HDRL system of the present principles can implement collaborative decision-making during a mission. To further increase collaboration between human operators and the unmanned platforms, an operator can be provided semantic feedback about a current state of the world and the mission. By using the semantic information accumulated at each layer of autonomy (i.e., deliberative, perceptive, and reactive), an aggregate report can be created to increase an operator's situational awareness in the form of textual descriptions about current and past observations, current progress towards individual goals, and a high-level overview of identified threats or targets.

In some embodiment, an operator can in turn provide semantic feedback that will be incorporated to augment each of the platform's policies. This augmentation can come in several different forms. At a high level, the operator can provide additional information such as further external knowledge to supplement either the scene or team graph knowledge bases. With both the platform and the human operator understanding the world at the graph level, an operator can manipulate nodes and edges of either the scene graph or knowledge graph used as input to the Perceptive Autonomy layer. An operator can also directly alter the high-level planning occurring at the Deliberative Autonomy layer. For example, if the Deliberative Autonomy layer is made capable of providing a high-level semantic description of a mission that it is executing, a human operator can suggest alternative high-level goals than those currently under operation, supplementing the policy with further subtasks deemed relevant by the human operator.

Although embodiments of the present principles have been described with respect to a team of platforms being applied to a military application, as depicted in FIG. 2, embodiments of the present principles can be applied to substantially any application in which a team of platforms can be coordinated for achieving a global purpose. For example, embodiments of the present principles can be applied for controlling a team of platforms in a warehouse environment. In such embodiments, platforms can be controlled in accordance with the present principles to maintain a shipping environment, which can include functions including but not limited to stocking shelves with product, to taking inventory, to loading trucks for delivery. In such embodiments, the functionality of heterogeneous platforms having varying specialized functions can be coordinated in accordance with the present principles to accomplish the collective goals of, for example, stocking, taking inventory and shipping.

Similarly, embodiments of the present principles can be applied for controlling a team of platforms in a construction environment. In such embodiments, platforms can be controlled in accordance with the present principles to perform construction functions, which can include functions including but not limited to moving material including dirt, leveling land, constructing buildings and the like. In such embodiments, the functionality of heterogeneous platforms having varying, specialized functions can be coordinated in accordance with the present principles to accomplish the collective goals of, for example, constructing a building and lot. Embodiments of the present principles can have various other applications.

Figure 11:
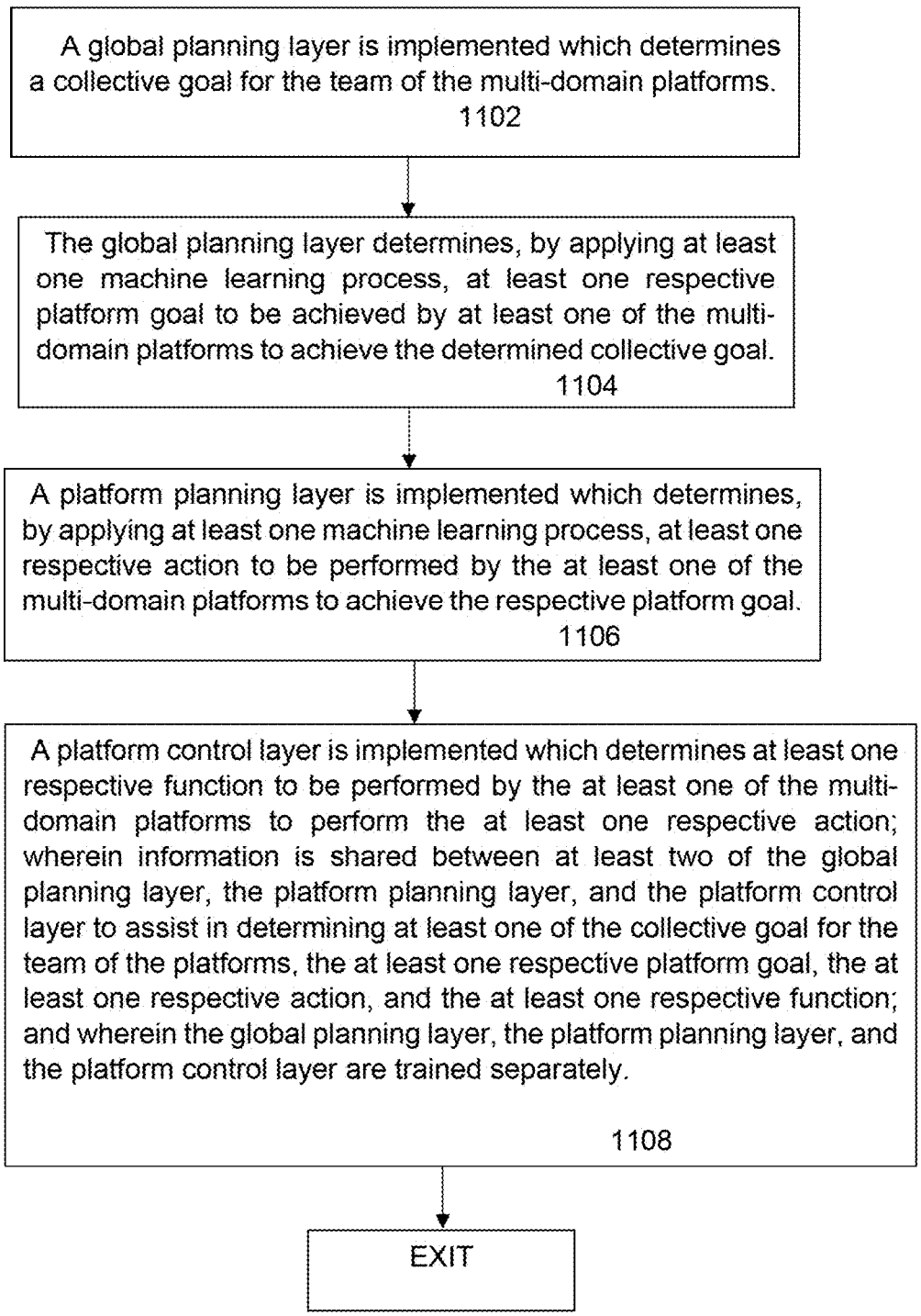
FIG. 11 depicts a flow diagram for hierarchical, deep reinforcement learning (DRL) based planning and control for coordinating a team of multi-domain platforms in accordance with an embodiment of the present principles.

FIG. 11 depicts a flow diagram for hierarchical, deep reinforcement learning (DRL) based planning and control for coordinating a team of multi-domain platforms in accordance with an embodiment of the present principles. The method 1100 begins at 1102 during which a global planning layer is implemented which determines a collective goal for the team of the multi-domain platforms. The method 1100 can proceed to 1104.

At 1104, the global planning layer determines, by applying at least one machine learning process, at least one respective platform goal to be achieved by at least one of the multi-domain platforms to achieve the determined collective goal. The method 1100 can proceed to 1106.

At 1106, a platform planning layer is implemented which determines, by applying at least one machine learning process, at least one respective action to be performed by the at least one of the multi-domain platforms to achieve the respective platform goal. The method 1100 can proceed to 1108.

At 1108, a platform control layer is implemented which determines at least one respective function to be performed by the at least one of the multi-domain platforms to perform the at least one respective action. The method 1100 can be exited.

In the method 1100 of FIG. 11, the global planning layer, the platform planning layer, and the platform control layer are capable of sharing information determined by the respective layers, however each of the global planning layer, the platform planning layer, and the platform control layer are trained individually.

As depicted in FIG. 1, embodiments of a HDRL system in accordance with the present principles, such as the HDRL system 100 of FIG. 1, can be implemented in a computing device 1200. That is, in some embodiments, image information, communications, data, human input and the like can be communicated to and among platforms and components of the HDRL system of the present principles, such as the HDRL system 100 of FIG. 1, using the computing device 1200 via, for example, any input/output means associated with the computing device 1200. Output data and information associated with a HDRL system of the present principles can be presented to a user using an output device of the computing device 1200, such as a display, a printer or any other form of output device.

Figure 12:
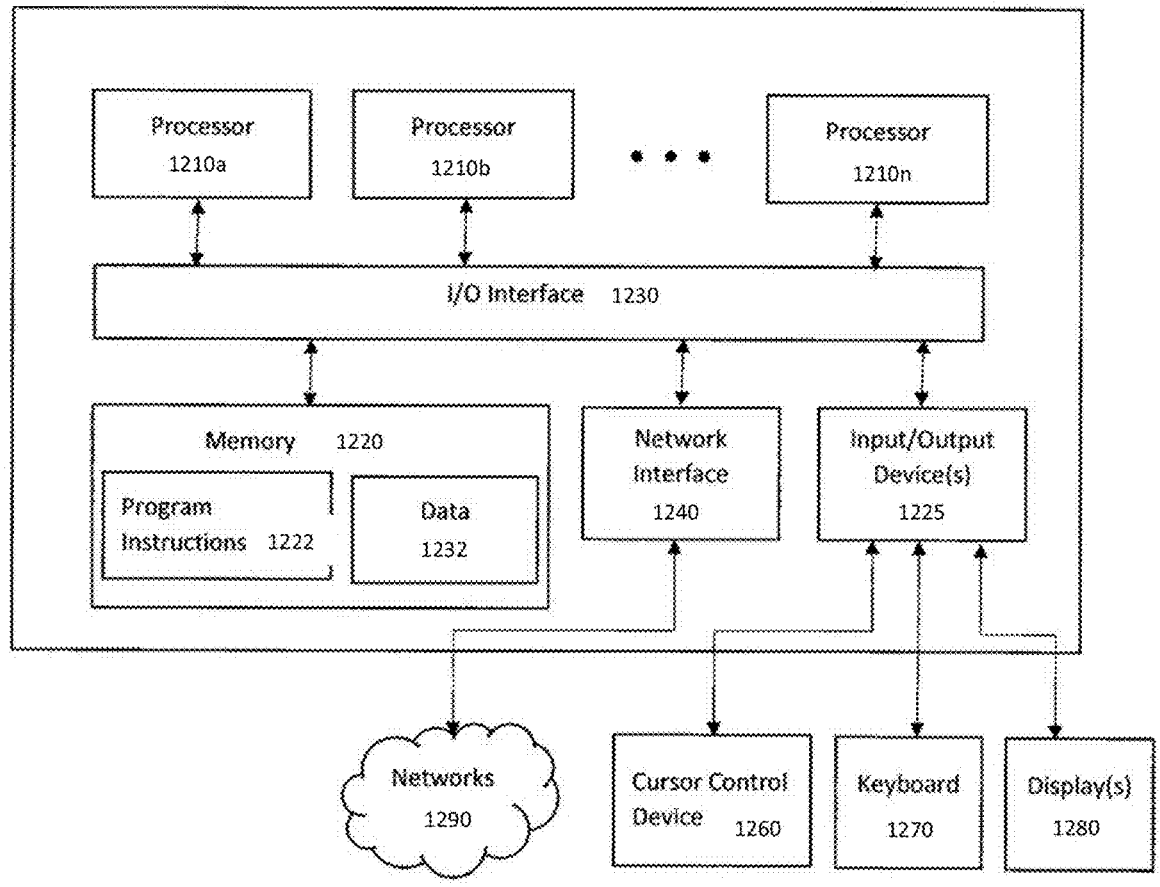
FIG. 12 depicts a high-level block diagram of a computing device suitable for use with embodiments of an HDRL system in accordance with an embodiment of the present principles.

For example, FIG. 12 depicts a high-level block diagram of a computing device 1200 suitable for use with embodiments of HDRL system in accordance with the present principles such as the HDRL system 100 of FIG. 1. In some embodiments, the computing device 1200 can be configured to implement methods of the present as processor-executable executable program instructions 1222 (e.g., program instructions executable by processor(s) 1210) in various embodiments.

In the embodiment of FIG. 12, the computing device 1200 includes one or more processors 1210a-1210n coupled to a system memory 1220 via an input/output (I/O) interface 1230. The computing device 1200 further includes a network interface 1240 coupled to I/O interface 1230, and one or more input/output devices 1250, such as cursor control device 1260, keyboard 1270, and display(s) 1280. In various embodiments, a user interface can be generated and displayed on display 1280. In some cases, it is contemplated that embodiments can be implemented using a single instance of computing device 1200, while in other embodiments multiple such systems, or multiple nodes making up the computing device 1200, can be configured to host different portions or instances of various embodiments. For example, in one embodiment some elements can be implemented via one or more nodes of the computing device 1200 that are distinct from those nodes implementing other elements. In another example, multiple nodes may implement the computing device 1200 in a distributed manner.

In different embodiments, the computing device 1200 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1200 can be a uniprocessor system including one processor 1210, or a multiprocessor system including several processors 1210 (e.g., two, four, eight, or another suitable number). Processors 1210 can be any suitable processor capable of executing instructions. For example, in various embodiments processors 1210 may be general-purpose or embedded processors implementing any of a variety of instruction set architectures (ISAs). In multiprocessor systems, each of processors 1210 may commonly, but not necessarily, implement the same ISA.

System memory 1220 can be configured to store program instructions 1222 and/or data 1232 accessible by processor 1210. In various embodiments, system memory 1220 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1220. In other embodiments, program instructions and/or data can be received, sent or stored upon different types of computer-accessible media or on similar media separate from system memory 1220 or computing device 1200.

In one embodiment, I/O interface 1230 can be configured to coordinate I/O traffic between processor 1210, system memory 1220, and any peripheral devices in the device, including network interface 1240 or other peripheral interfaces, such as input/output devices 1250. In some embodiments, I/O interface 1230 can perform any necessary protocol, timing or other data transformations to convert data signals from one component (e.g., system memory 1220) into a format suitable for use by another component (e.g., processor 1210). In some embodiments, I/O interface 1230 can include support for devices attached through various types of peripheral buses, such as a variant of the Peripheral Component Interconnect (PCI) bus standard or the Universal Serial Bus (USB) standard, for example. In some embodiments, the function of I/O interface 1230 can be split into two or more separate components, such as a north bridge and a south bridge, for example. Also, in some embodiments some or all of the functionality of I/O interface 1230, such as an interface to system memory 1220, can be incorporated directly into processor 1210.

Network interface 1240 can be configured to enable data to be exchanged between the computing device 1200 and other devices attached to a network (e.g., network 1290), such as one or more external systems or between nodes of the computing device 1200. In various embodiments, network 1290 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1250 can, in some embodiments, include one or more display terminals, keyboards, keypads, touchpads, scanning devices, voice or optical recognition devices, or any other devices suitable for entering or accessing data by one or more computer systems. Multiple input/output devices 1250 can be present in computer system or can be distributed on various nodes of the computing device 1200. In some embodiments, similar input/output devices can be separate from the computing device 1200 and can interact with one or more nodes of the computing device 1200 through a wired or wireless connection, such as over network interface 1240.

Those skilled in the art will appreciate that the computing device 1200 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1200 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1200 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1200 can further include a web browser.

Although the computing device 1200 is depicted as a general purpose computer, the computing device 1200 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1200 can be transmitted to the computing device 1200 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 13:
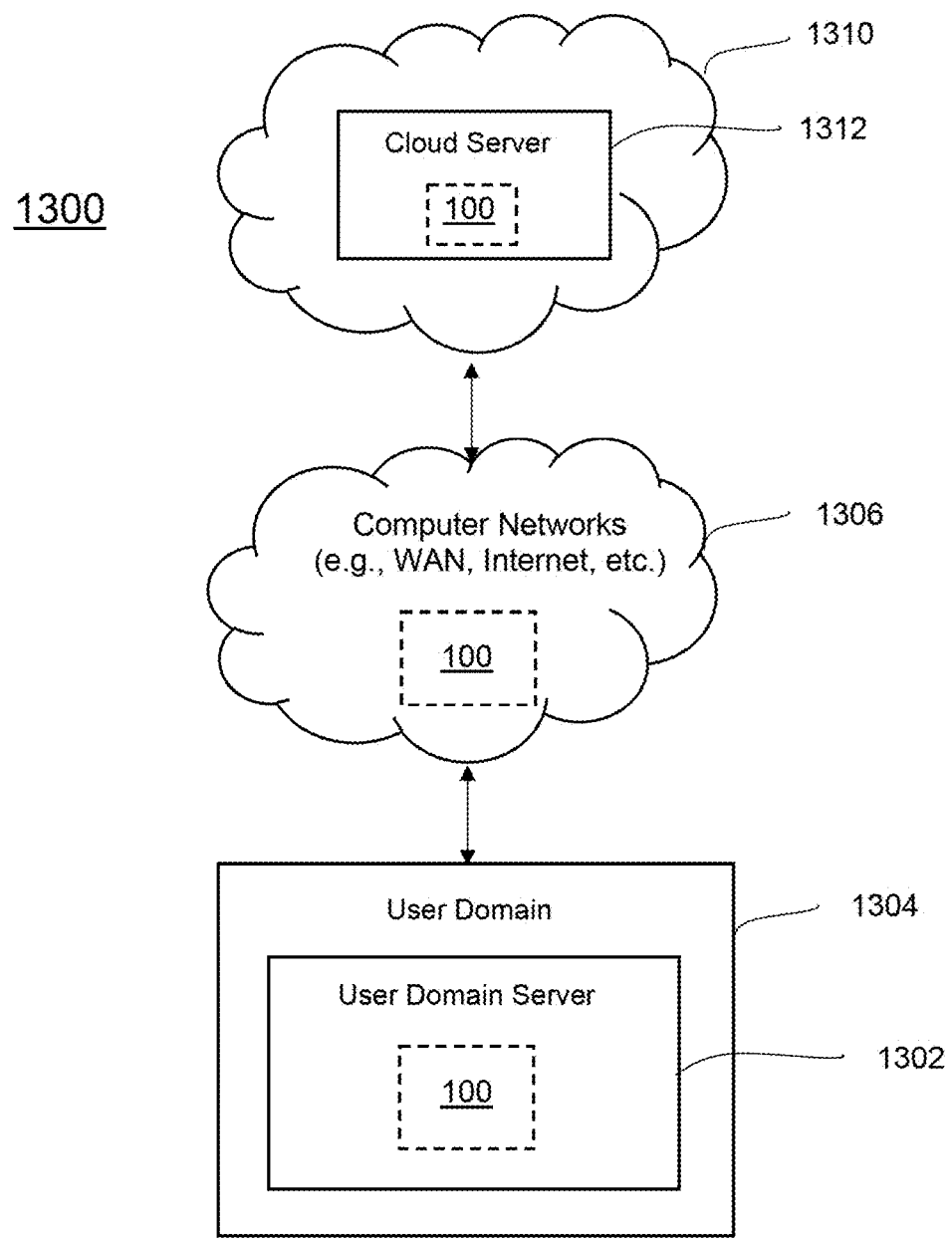
FIG. 13 depicts a high-level block diagram of a network in which embodiments of an HDRL system of the present principles can be implemented in accordance with an embodiment of the present principles.

FIG. 13 depicts a high-level block diagram of a network in which embodiments of HDRL system of the present principles, such as the HDRL system 100 of FIG. 1, can be implemented. The network environment 1300 of FIG. 13 illustratively comprises a user domain 1302 including a user domain server/computing device 1304. The network environment 1300 of FIG. 13 further comprises computer networks 1306, and a cloud environment 1310 including a cloud server/computing device 1312.

In the network environment 1300 of FIG. 13, an HDRL system for planning and control for coordinating a team of multi-domain platforms in accordance with the present principles, such as the HDRL system 100 of FIG. 1, can be included in at least one of the user domain server/computing device 1304, the computer networks 1306, and the cloud server/computing device 1312. That is, in some embodiments, a user can use a local server/computing device (e.g., the user domain server/computing device 1304) to provide an HDRL system for planning and control for coordinating a team of multi-domain platforms in accordance with the present principles.

In some embodiments, a user can implement an HDRL system of the present principles in the computer networks 1306 to provide planning and control for coordinating a team of multi-domain platforms in accordance with the present principles. Alternatively or in addition, in some embodiments, a user can implement an HDRL system of the present principles in the cloud server/computing device 1312 of the cloud environment 1310 to provide planning and control for coordinating a team of multi-domain platforms in accordance with the present principles. For example, in some embodiments it can be advantageous to perform processing functions of the HDRL system of the present principles in the cloud environment 1310 to take advantage of the processing capabilities and storage capabilities of the cloud environment 1310.

In some embodiments in accordance with the present principles, an HDRL system for providing planning and control for coordinating a team of multi-domain platforms can be located in a single and/or multiple locations/servers/computers to perform all or portions of the herein described functionalities of a system in accordance with the present principles in a distributed manner. For example, in some embodiments any combination of the platform control modules 110, the platform planning modules 120, the global planning module 130 and the platforms 150 of the HDRL system of the present principles can be located in one or more than one different ones of the user domain 1302, the computer network environment 1306, and the cloud environment 1310 for providing the functions of an HDRL system of the present principles described herein either locally or remotely.

In some embodiments, the planning and control for coordinating a team of multi-domain platforms of an HDRL system of the present principles can be provided as a service, for example via software. In such embodiments, the software of the present principles can reside in at least one of the user domain server/computing device 1304, the computer networks 1306, and the cloud server/computing device 1312. Even further, in some embodiments software for providing the embodiments of the present principles can be provided via a non-transitory computer readable medium that can be executed by a computing device at any of the computing devices at the user domain server/computing device 1304, the computer networks 1306, and the cloud server/computing device 1312.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. An artificial intelligence-based method for coordinating a team of platforms, the method comprising:
   implementing a global planning layer for;
      determining a collective goal for the team of the platforms; and
      determining, by applying at least one machine learning process, at least one respective platform goal to be achieved by at least one of the platforms to achieve the determined collective goal;
   implementing a platform planning layer for determining, by applying at least one machine learning process, at least one respective action to be performed by the at least one of the platforms to achieve the respective platform goal; and
   implementing a platform control layer for determining at least one respective function to be performed by the at least one of the platforms to perform the at least one respective action;
   wherein information is shared between at least two of the global planning layer, the platform planning layer, and the platform control layer to assist in determining at least one of the collective goal for the team of the platforms, the at least one respective platform goal, the at least one respective action, and the at least one respective function; and
   wherein the global planning layer, the platform planning layer, and the platform control layer are trained separately.

2. The method of claim 1, wherein the at least one machine learning process applied by at least one of the global planning layer and the platform planning layer comprises a policy planning process, which rewards a platform for performing an action which advances an achievement of at least one of the determined collective goal for the team of the platforms, the determined at least one respective platform goal, and the determined at least one respective action.

3. The method of claim 1, further comprising:
   communicating information determined as a result of at least one function performed by at least one of the platforms to at least one of the global planning layer, the platform planning layer, and the platform control layer to assist in determining at least one of the collective goal for the team of the platforms, the at least one respective platform goal, the at least one respective action, and the at least one respective function.

4. The method of claim 1, wherein at least one of the platforms comprises a sensor device for capturing sensor data of at least one environment of the team of platforms.

5. The method of claim 4, further comprising;
   communicating the captured sensor data to the platform planning layer for determining at least one of a physical layout and a semantic layout of the at least one environment.

6. The method of claim 5, further comprising:
   at the platform planning layer, considering at least one of the physical layout and the semantic layout of the at least one environment when determining the at least one respective action; and
   communicating information regarding the at least one of the physical layout and the semantic layout of the at least one environment to the global planning layer to be considered when determining at least one of the collective goal for the team of the platforms and the at least one respective platform goal.

7. The method of claim 1, wherein operations of the global planning layer, the platform planning layer, and the platform control layer are performed in parallel.

8. The method of claim 1, further comprising applying a machine learning process to predict movement and actions of at least one of independent and adversarial platforms in an environment of the team of platforms.

9. The method of claim 1, wherein the at least one machine learning process applied by at least one of the global planning layer and the platform planning layer comprises at least a graph network, which models non-local connections in data for assisting in determining at least one of the determined collective goal for the team of the platforms, the determined at least one respective platform goal, and the determined at least one respective action.

10. The method of claim 1, further comprising:
    considering user inputs when determining at least one of the collective goal, the determined respective platform goals, the respective platform actions, and the respective platform functions.

11. The method of claim 1, wherein a global planning layer, a platform planning layer and a platform control layer are implemented in at least one of 1) a platform of the team of platforms, 2) a central computing device, or 3) both, in order to create a decentralized system, centralized system or combination system, respectively, for coordinating the team of platforms.

12. The method of claim 1, further comprising implementing the platform control layer for controlling the at least one of the platforms to perform the at least one respective function.

13. A system for coordinating a team of platforms, comprising:
    a global planning module implementing a global planning layer for;
       determining a collective goal for the team of the platforms; and
       determining, by applying at least one machine learning process, at least one respective platform goal to be achieved by at least one of the platforms to achieve the determined collective goal;
    a platform planning module implementing a platform planning layer for determining, by applying at least one machine learning process, at least one respective action to be performed by the at least one of the platforms to achieve the respective platform goal; and
    a platform control module implementing a platform control layer for determining at least one respective function to be performed by the at least one of the platforms to perform the at least one respective action;
    wherein information is shared between at least two of the global planning layer, the platform planning layer, and the platform control layer to assist in determining at least one of the collective goal for the team of the platforms, the at least one respective platform goal, the at least one respective action, and the at least one respective function; and
    wherein the global planning layer, the platform planning layer, and the platform control layer are trained separately.

14. The system of claim 13, further comprising:
    a storage device for storing information determined by at least one of a platform of the team of platforms, the global planning module, the platform planning module and the platform control module to be used at any time to assist in determining at least one of the determined collective goal for the team of the platforms, the determined at least one respective platform goal, the determined at least one respective action, and the determined at least one respective function.

15. The system of claim 13, wherein at least one of the platforms comprises a sensing device for collecting information of at least one environment of the team of platforms.

16. The apparats of claim 15, wherein the platform planning module is configured to:
  receive collected information and determine at least one of a physical layout and a semantic layout of the at least one environment;
  consider the determined at least one of the physical layout and the semantic layout of the at least one environment when determining the at least one respective action; and
  communicate information regarding the at least one of the physical layout and the semantic layout of the at least one environment to the global planning module to be considered by the global planning module when determining at least one of the collective goal for the team of platforms and the at least one respective platform goal.

17. The system of claim 13, wherein the global planning module, the platform planning module, and the platform control module operate in parallel.

18. The system of claim 13, further comprising a user interface for at least one of enabling a user to input information that is to be considered when determining at least one of the collective goal, the respective platform goals, the respective actions, and the respective functions, and enabling a user to view information determined by at least one of the global planning module, the platform planning module, and the platform control module.

19. The system of claim 13, wherein the at least one machine learning process applied by at least one of the global planning layer and the platform planning layer comprises a policy planning process, which rewards a platform for performing an action which advances an achievement of at least one of the determined collective goal for the team of the platforms, the determined at least one respective platform goal, and the determined at least one respective action.

20. The system of claim 13, wherein a global planning module, a platform planning module and a platform control module reside in at least one of 1) a platform of the team of platforms, 2) a central computing device, or 3) both, in order to create a decentralized system, centralized system or combination system, respectively, for coordinating the team of platforms.

21. The apparatus of claim 13, wherein at least one of the global planning module and the platform planning module applies a machine learning process to predict movement and actions of at least one of independent and adversarial platforms in an environment of the platforms.

22. The system of claim 13, wherein the at least one machine learning process applied by at least one of the global planning layer and the platform planning layer comprises at least a graph network, which models non-local connections in data for assisting in determining at least one of the determined collective goal for the team of the platforms, the determined at least one respective platform goal, and the determined at least one respective action.

23. The system of claim 13, wherein the platform control module further implements the platform control layer for controlling the at least one of the platforms to perform the at least one respective function.

24. A non-transitory computer readable medium having stored thereon, software instructions that when executed by the at least one processor of a computing device, cause the computing device to perform an artificial intelligence-based method for coordinating a team of platforms, the method comprising at least:
  implementing a global planning layer for;
    determining a collective goal for the team of the platforms; and
    determining, by applying at least one machine learning process, at least one respective platform goal to be achieved by at least one of the platforms to achieve the determined collective goal;
  implementing a platform planning layer for determining, by applying at least one machine learning process, at least one respective action to be performed by the at least one of the platforms to achieve the respective platform goal; and
  implementing a platform control layer for determining at least one respective function to be performed by the at least one of the platforms to perform the at least one respective action;
  wherein information is shared between at least two of the global planning layer, the platform planning layer, and the platform control layer to assist in determining at least one of the collective goal for the team of the platforms, the at least one respective platform goal, the at least one respective action, and the at least one respective function; and
  wherein the global planning layer, the platform planning layer, and the platform control layer are trained separately.

* * * * *